(12) United States Patent
Yamamoto

(10) Patent No.: US 9,905,053 B2
(45) Date of Patent: Feb. 27, 2018

(54) INFORMATION PROCESSING DEVICE, INFORMATION PROCESSING METHOD, AND COMPUTER PROGRAM PRODUCT

(71) Applicant: Daisuke Yamamoto, Tokyo (JP)

(72) Inventor: Daisuke Yamamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/278,263

(22) Filed: Sep. 28, 2016

(65) Prior Publication Data

US 2017/0103575 A1   Apr. 13, 2017

(30) Foreign Application Priority Data

Oct. 7, 2015   (JP) .................. 2015-199693

(51) Int. Cl.
| | | |
|---|---|---|
| G06T 19/00 | (2011.01) | |
| G06T 19/20 | (2011.01) | |
| G06T 3/40 | (2006.01) | |
| G06T 3/60 | (2006.01) | |

(Continued)

(52) U.S. Cl.
CPC .............. *G06T 19/006* (2013.01); *G06T 3/40* (2013.01); *G06T 3/60* (2013.01); *G06T 7/70* (2017.01); *G06T 19/20* (2013.01); *G09G 5/40* (2013.01); *G06T 2219/2016* (2013.01); *G09G 2320/10* (2013.01); *G09G 2360/16* (2013.01)

(58) Field of Classification Search
None
See application file for complete search history.

(56) References Cited

U.S. PATENT DOCUMENTS

| | | |
|---|---|---|
| 2012/0242846 A1 | 9/2012 | Iwase |
| 2014/0006435 A1 | 1/2014 | Kishi et al. |

(Continued)

FOREIGN PATENT DOCUMENTS

| | | |
|---|---|---|
| JP | 4032776 | 11/2007 |
| JP | 2014-010722 | 1/2014 |

OTHER PUBLICATIONS

Chong et al., "Methodologies for Immersive Robot Programming in an Augmented Reality Environment", International Journal of Virtual Reality, 2007, pp. 6(1):69-79.*

(Continued)

*Primary Examiner* — Ke Xiao
*Assistant Examiner* — Jed-Justin Imperial
(74) *Attorney, Agent, or Firm* — Cooper & Dunham LLP

(57) ABSTRACT

An information processing device includes: circuitry configured to: obtain a captured image including position identification information identifying a position at which a virtual abject representing a target to be placed is to be displayed; generate a composite image in which the virtual object is combined at a position on the captured image, the position identified by the position identification information; receive an operation causing the virtual object included in the composite image, to operate; and control display depicting operation of the virtual object based on display setting information including specification information defining specifications of the target to be placed, in response to the operation receiving unit receiving the operation causing the virtual object to operate.

8 Claims, 32 Drawing Sheets

(51) Int. Cl.
*G06T 7/70* (2017.01)
*G09G 5/40* (2006.01)

(56) References Cited

U.S. PATENT DOCUMENTS

2014/0285522 A1* 9/2014 Kim ................... G06T 19/006
 345/633
2014/0316192 A1* 10/2014 de Zambotti ......... A61M 21/02
 600/28

OTHER PUBLICATIONS

Partial European Search dated Jan. 31, 2017 in corresponding European Patent Application No. 16189683.2.
BrotherAsiaPacific. "Brother Inkjet Multi-Function Centres—Augmented Reality Demonstration." YouTube. YouTube, Nov. 15, 2011. Web. Mar. 9, 2017.
"3D brother", Brother International Singapore Ltd. 2014, XP002766066.
S. Feiner et al. "Knowledge Based Augmented Reality", Communications of the ACM, 36(7): 53-57 (1993).
D. W. F. van Krevelen et al. "A Survey of Augmented Reality Technologies, Applications and Limitations", The International Journal of Virtual Reality, 9(2): 1-20 (2010).
Ryu Higashi "Product Location Simulation and Other Applications Using Augmented Reality" *Konica Minolta Technology Report* 2013 (10), pp. 9-13.

* cited by examiner

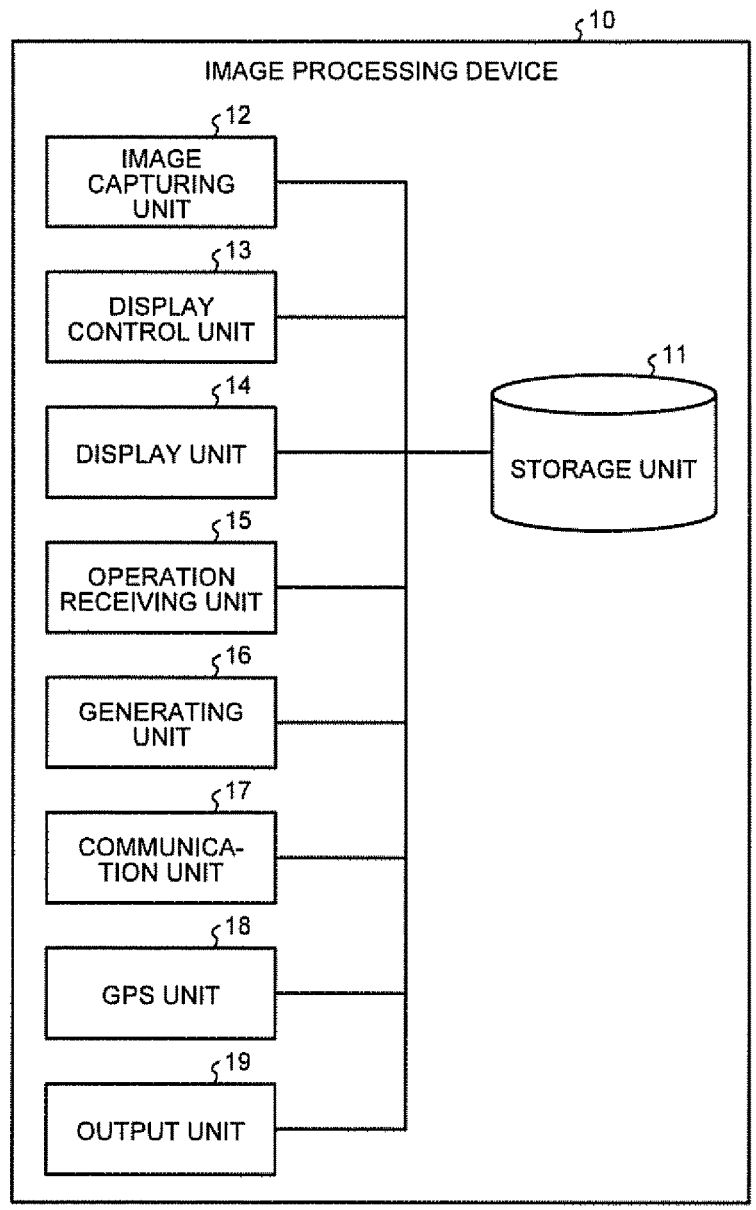

FIG.6

| MODEL NAME | BANK | DISPLAY REFERENCE POINT | MAXIMUM NUMBER OF BANKS |
|---|---|---|---|
| PRINTER A | BankimageA | (x_a6,y_a6,z_a6) | 1 |
| PRINTER B | BankimageB | (x_b6,y_b6,z_b6) | 3 |
| ⋮ | ⋮ | ⋮ | ⋮ |

FIG.7

| MODEL NAME | FINISHER | DISPLAY REFERENCE POINT |
|---|---|---|
| PRINTER A | FinisherimageA | (x_a7,y_a7,z_a7) |
| PRINTER B | FinisherimageB | (x_b7,y_b7,z_b7) |
| ⋮ | ⋮ | ⋮ |

FIG.8

| MODEL NAME | ADF | | DISPLAY REFERENCE POINT |
|---|---|---|---|
| | OPEN | CLOSE | |
| PRINTER A | ADF_openimageA | ADF_closeimageA | (x_a1,y_a1,z_a1) |
| PRINTER B | - | - | - |
| ⋮ | ⋮ | ⋮ | ⋮ |

FIG.9

| MODEL NAME | TONER COVER | | DISPLAY REFERENCE POINT |
|---|---|---|---|
| | OPEN | CLOSE | |
| PRINTER A | Toner_openimageA | Toner_closeimageA | (x_a2,y_a2,z_a2) |
| PRINTER B | Toner_openimageB | Toner_closeimageB | (x_b2,y_b2,z_b2) |
| ⋮ | ⋮ | ⋮ | ⋮ |

FIG.10

| MODEL NAME | PAPER TRAY | | DISPLAY REFERENCE POINT |
|---|---|---|---|
| | OPEN | CLOSE | |
| PRINTER A | Tray_openimageA | Tray_closeimageA | (x_a3,y_a3,z_a3) |
| PRINTER B | Tray_openimageB | Tray_closeimageB | (x_b3,y_b3,z_b3) |
| ⋮ | ⋮ | ⋮ | ⋮ |

FIG.11

| MODEL NAME | DUPLEX UNIT COVER | | DISPLAY REFERENCE POINT |
|---|---|---|---|
| | OPEN | CLOSE | |
| PRINTER A | Cover_openimageA | Cover_closeimageA | (x_a4,y_a4,z_a4) |
| PRINTER B | Cover_openimageB | Cover_closeimageB | (x_b4,y_b4,z_b4) |
| ⋮ | ⋮ | ⋮ | ⋮ |

FIG.12

| MODEL NAME | SIZE | COLOR/ MONO- CHROME | ppm | PRINTING OPERATION | DISPLAY REFERENCE POINT |
|---|---|---|---|---|---|
| PRINTER A | A4 | COLOR | 18 | PrintingimageAc | (x_a5,y_a5,z_a5) |
| PRINTER A | A4 | MONO- CHROME | 20 | PrintingimageAm | (x_a5,y_a5,z_a5) |
| PRINTER B | A4 | MONO- CHROME | 30 | PrintingimageB4 | (x_b5,y_b5,z_b5) |
| PRINTER B | A3 | MONO- CHROME | 15 | PrintingimageB3 | (x_b5,y_b5,z_b5) |
| ⋮ | ⋮ | ⋮ | ⋮ | ⋮ | ⋮ |

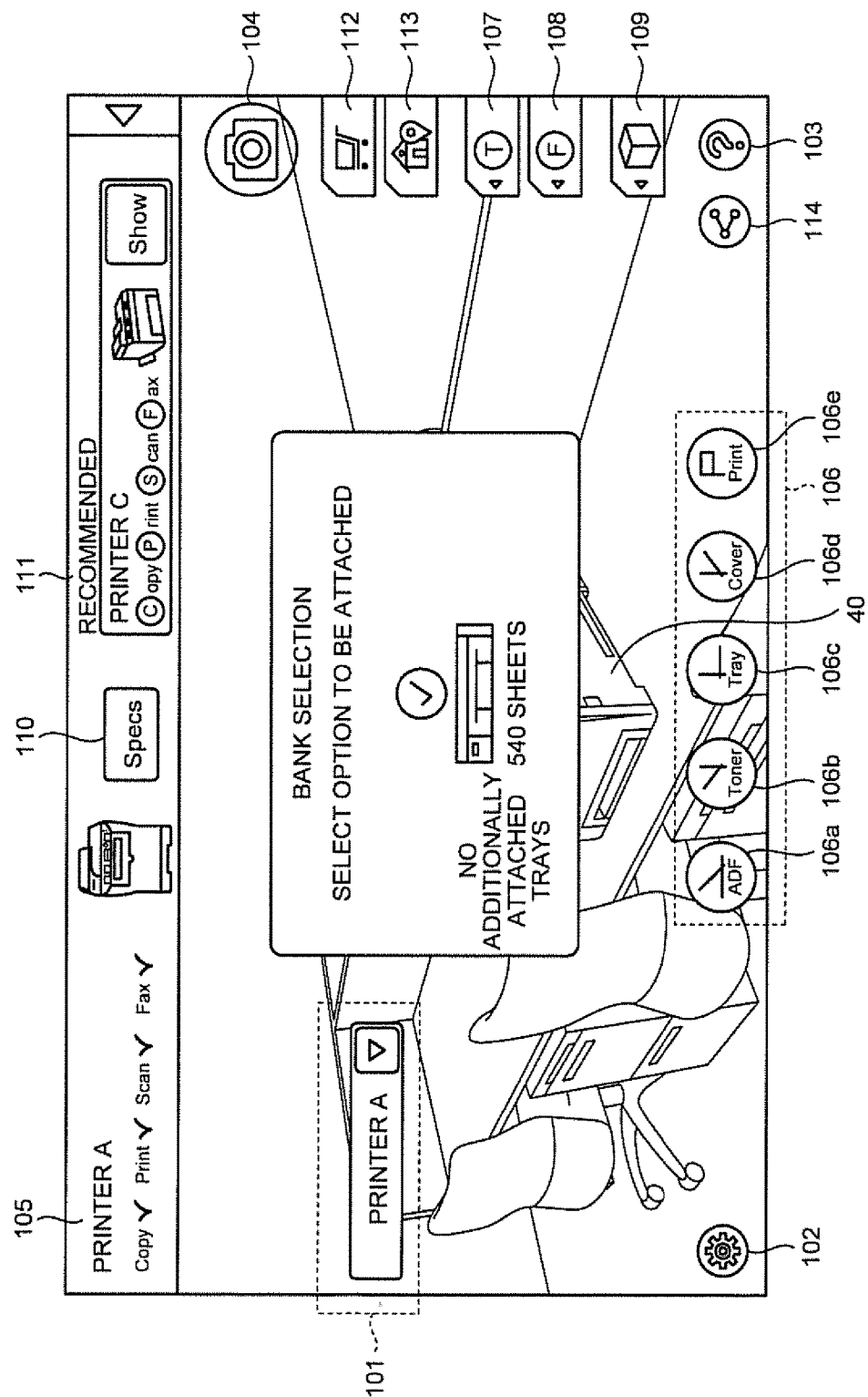

FIG.24

| MODEL NAME | MAIN BODY |
|---|---|
| PROJECTOR Pa | MainbodyimagePa |
| PROJECTOR Pb | MainbodyimagePb |
| ⋮ | ⋮ |

FIG.25

| MODEL NAME | BRIGHTNESS [lm] | SIZE | DISTANCE [m] | PROJECTION OPERATION | DISPLAY REFERENCE POINT |
|---|---|---|---|---|---|
| PROJECTOR Pa | 3600 | TYPE 40 | 1.23 | ProjectionimagePa1 | (x_pa1,y_pa1,z_pa1) |
| PROJECTOR Pa | 3600 | TYPE 100 | 3.15 | ProjectionimagePa3 | (x_pa3,y_pa3,z_pa3) |
| PROJECTOR Pb | 3000 | TYPE 40 | 1.23 | ProjectionimagePb1 | (x_pb1,y_pb1,z_pb1) |
| ... | ... | ... | ... | ... | ... |

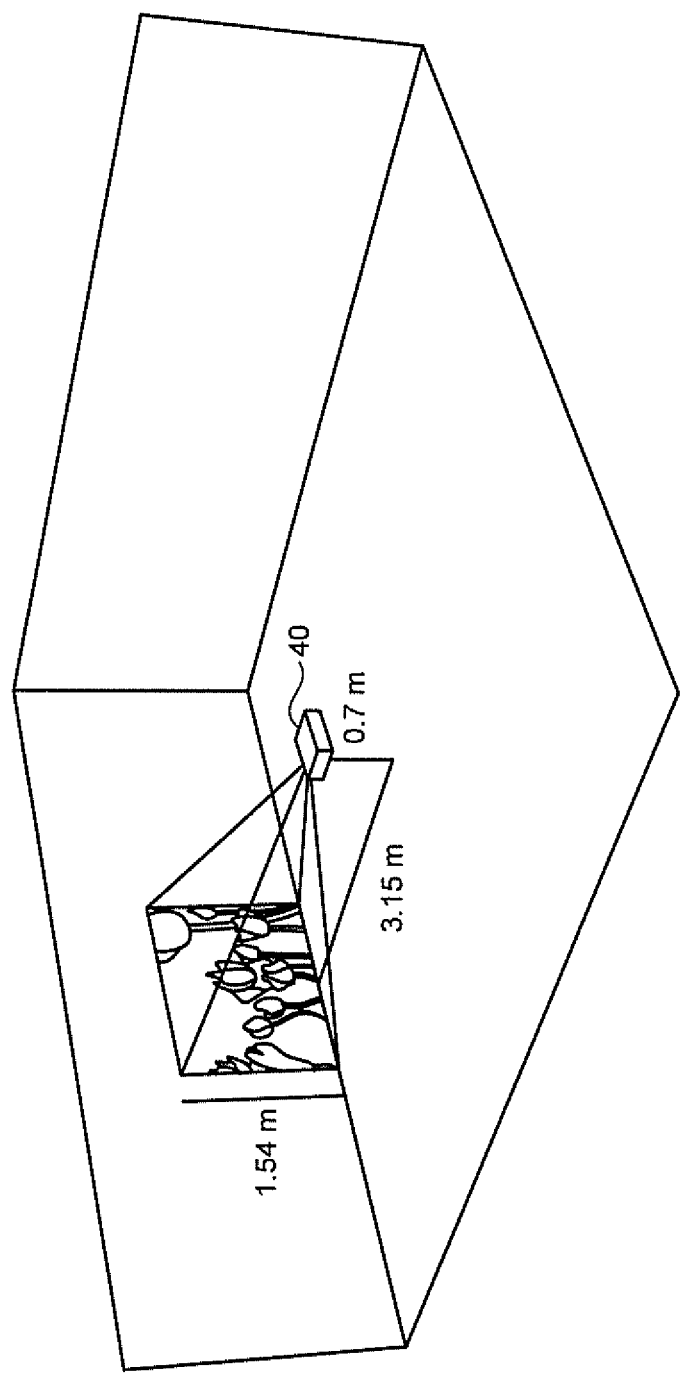

FIG.29

| MODEL NAME | MAIN BODY |
|---|---|
| WASHING MACHINE Wa | MainbodyimageWa |
| WASHING MACHINE Wb | MainbodyimageWb |

FIG.30

| MODEL NAME | DOOR | | DISPLAY REFERENCE POINT |
|---|---|---|---|
| | OPEN | CLOSE | |
| WASHING MACHINE Wa | Door_openimageWa | Door_closeimageWa | (x_wa,y_wa,z_wa) |
| WASHING MACHINE Wb | Door_openimageWb | Door_closeimageWb | (x_wb,y_wb,z_wb) |
| ⋮ | ⋮ | ⋮ | ⋮ |

FIG.31

| MODEL NAME | OPERATION SOUND [dB] | WASHING OPERATION | DISPLAY REFERENCE POINT |
|---|---|---|---|
| WASHING MACHINE Wa | 30 | WashingimageWa | (x_wa,y_wa,z_wa) |
| WASHING MACHINE Wb | 40 | WashingimageWb | (x_wb,y_wb,z_wb) |
| ⋮ | ⋮ | ⋮ | ⋮ |

INFORMATION PROCESSING DEVICE, INFORMATION PROCESSING METHOD, AND COMPUTER PROGRAM PRODUCT

CROSS-REFERENCE TO RELATED APPLICATIONS

The present application claims priority under 35 U.S.C. § 119 to Japanese Patent Application No. 2015-199693, filed Oct. 7, 2015. The contents of which are incorporated herein by reference in their entirety.

BACKGROUND OF THE INVENTION

1. Field of the Invention

The present invention relates to an information processing device, an information processing method, and a computer program product.

2. Description of the Related Art

An augmented reality technique (AR) has been conventionally known, which is for displaying a captured image depicting a real space captured by a camera, the captured image combined with a virtual object thereon. For example, an AR technique has been known, which is for three-dimensionally displaying, when a user captures an image of a sheet of paper including a predetermined pattern (an AR marker), or the like, a virtual object on the captured image, according to a positional relation between a camera and the sheet of paper. When the user refers to the virtual object displayed on the captured image, the user is able to get a grasp of an image of a case where the user actually has placed an object corresponding to the virtual object.

However, by the conventional techniques, even if a virtual object representing a target to be placed is displayed on a captured image, it has been difficult to get a grasp of an image of a case where the target to be placed is operated.

SUMMARY OF THE INVENTION

According to one aspect of the present invention, an information processing device includes circuitry. The circuitry is configured to obtain a captured image including position identification information identifying a position at which a virtual object representing a target to be placed is to be displayed. The circuitry is further configured to generate a composite image in which the virtual object is combined at a position on the captured image, the position identified by the position identification information. The circuitry is still further configured to receive an operation causing the virtual object included in the composite image, to operate. The circuitry is still further configured to control display depicting operation of the virtual object based on display setting information including specification information defining specifications of the target to be placed, in response to the operation receiving unit receiving the operation causing the virtual object to operate.

BRIEF DESCRIPTION OF THE DRAWINGS

FIG. 4 is a diagram illustrating an example of a configuration of an information processing device according to the first embodiment;

FIG. 5 is a diagram illustrating an example of initially displayed image information (for a printer) according to the first embodiment;

FIG. 6 is a diagram illustrating an example of attachable and detachable portion image information (for a bank) according to the first embodiment;

FIG. 7 is a diagram illustrating an example of the attachable and detachable portion image information (for a finisher) according to the first embodiment;

FIG. 8 is a diagram illustrating an example of movable portion image information (for an ADF) according to the first embodiment;

FIG. 9 is a diagram illustrating an example of the movable portion image information (for a toner cover) according to the first embodiment;

FIG. 10 is a diagram illustrating an example of the movable portion image information (for a paper tray) according to the first embodiment;

FIG. 11 is a diagram illustrating an example of the movable portion image information (for a duplex unit cover) according to the first embodiment;

FIG. 12 is a diagram illustrating an example of specification information (for printing operation) according to the first embodiment;

FIG. 18A is a diagram illustrating an example of a bank selection screen according to the first embodiment;

FIG. 24 is a diagram illustrating an example of initially displayed image information (for a projector) according to a second embodiment;

FIG. 25 is a diagram illustrating an example of specification information (for projection operation) according to the second embodiment;

FIG. 28B is a schematic diagram illustrating an example of the projection image (for Type 100) according to the second embodiment;

FIG. 29 is a diagram illustrating an example of initially displayed image information (for a washing machine) according to a third embodiment;

FIG. 30 is a diagram illustrating an example of movable portion image information (for a door) according to the third embodiment;

FIG. 31 is a diagram illustrating an example of specification information (for washing operation) according to the third embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
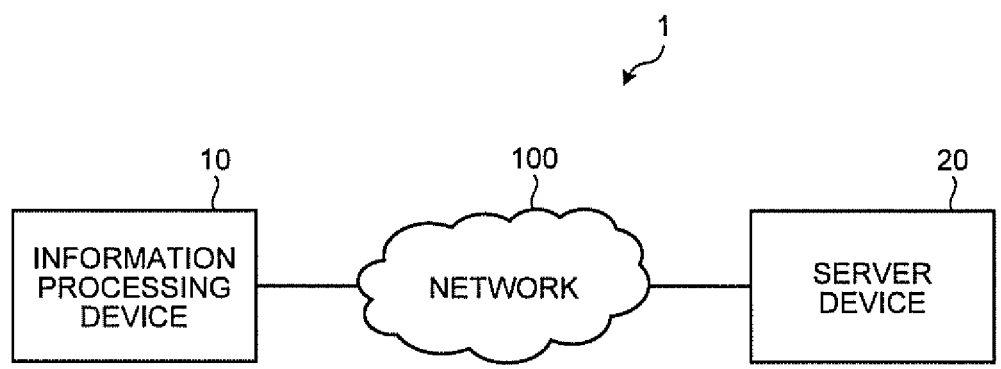
FIG. 1 is a diagram illustrating an example of a configuration of an information processing system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, with reference to the appended drawings, embodiments of an information processing device, an information processing method, and a computer program, will be described in detail.

An embodiment has an object to provide an information processing device, an information processing method, and a computer program product which enable a user to more clearly get a grasp of an image of a case where a target to be placed is operated.

First Embodiment

FIG. 1 is a diagram illustrating an example of a configuration of an information processing system 1 according to a first embodiment. The information processing system 1 according to this embodiment includes an information processing device 10, and a server apparatus 20. The information processing device 10 and the server apparatus 20 are connected via a network 100. A communication system for the network 100 may be a wireless system, a wired system, or a combination of the wireless system and the wired system. The network 100 is, for example, the Internet.

The information processing device 10 displays a composite image including a captured image obtained by capturing an image of an arbitrary location, the captured image combined with a virtual object thereon. The virtual object is a 3D model of an arbitrary object (a target to be placed). In describing the first embodiment, a case where the object corresponding to the virtual object is office equipment, will be described. In describing the first embodiment, although the description will be made with an example where the office equipment is a printer (a printing apparatus), the office equipment is not limited to the printer, and may be any office equipment. For example, the office equipment may be a projector (a projection apparatus). A case where the object corresponding to the virtual object is a projector will be described in a second embodiment. The information processing device 10 is, for example, a camera-equipped smart device.

The server apparatus 20 stores therein information, such as: an application (computer program) for the information processing device 10 to display the composite image including the virtual object; image information representing an AR marker; and display setting information for displaying the virtual object. The AR marker is position identification information identifying a position at which the virtual object is to be placed on the captured image in the composite image. Details of the display setting information will be described later, with reference to FIG. 5 to FIG. 12. The information stored in the server apparatus 20 is downloaded by the information processing device 10 via a Web site set up on the server apparatus 20, for example.

Figure 2A:
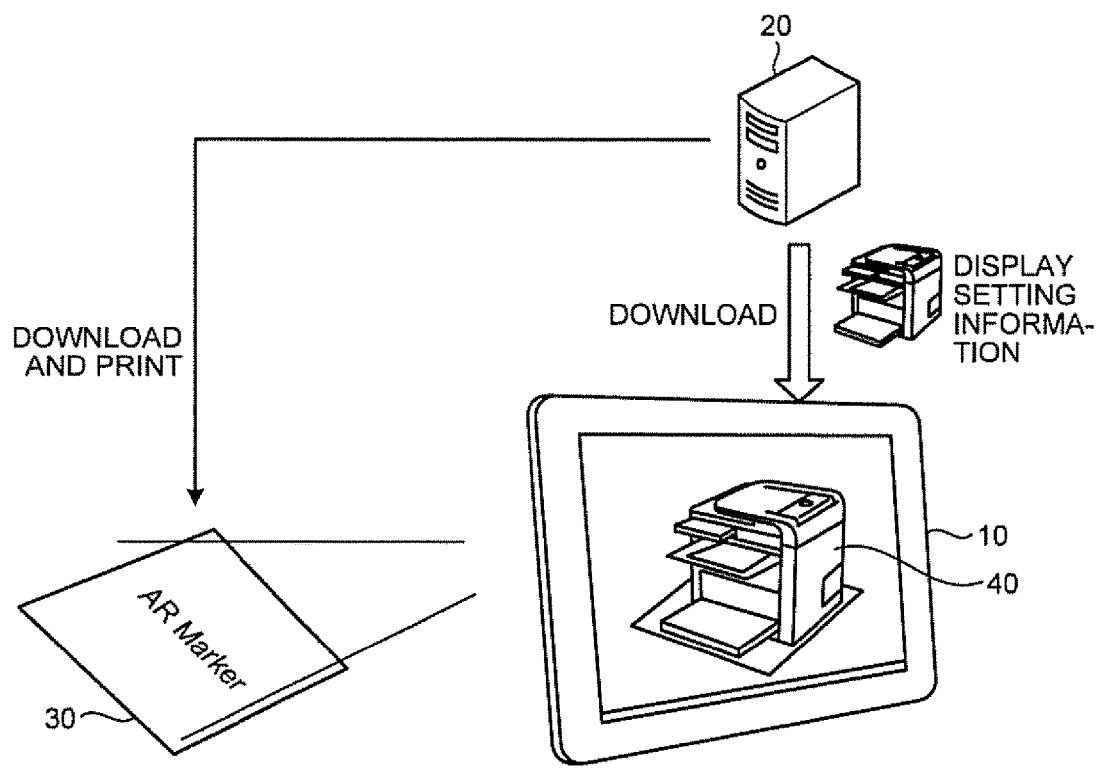
FIG. 2A is a diagram illustrating a first example of an outline of a method of displaying a virtual object according to the first embodiment.

FIG. 2A is a diagram illustrating a first example of an outline of a method of displaying a virtual object 40 according to the first embodiment. Firstly, a user of the information processing device 10 prints out image information representing an AR marker 30, the image information stored in the server apparatus 20 or information processing device 10, and places a printout depicting the AR marker 30 at a location at which the virtual object 40 is to be displayed. Subsequently, the information processing device 10 downloads, from the server apparatus 20, display setting information of a model to be displayed as the virtual object 40. Next, when the information processing device 10 captures a captured image including the printout depicting the AR marker 30, the virtual object 40 corresponding to the display setting information is displayed at the position of the printout included in the captured image.

In FIG. 1 and FIG. 2A, the configuration has one server apparatus 20, but the configuration for the information processing device 10 to obtain the information stored in the server apparatus 20 is not limited to this example.

Figure 2B:
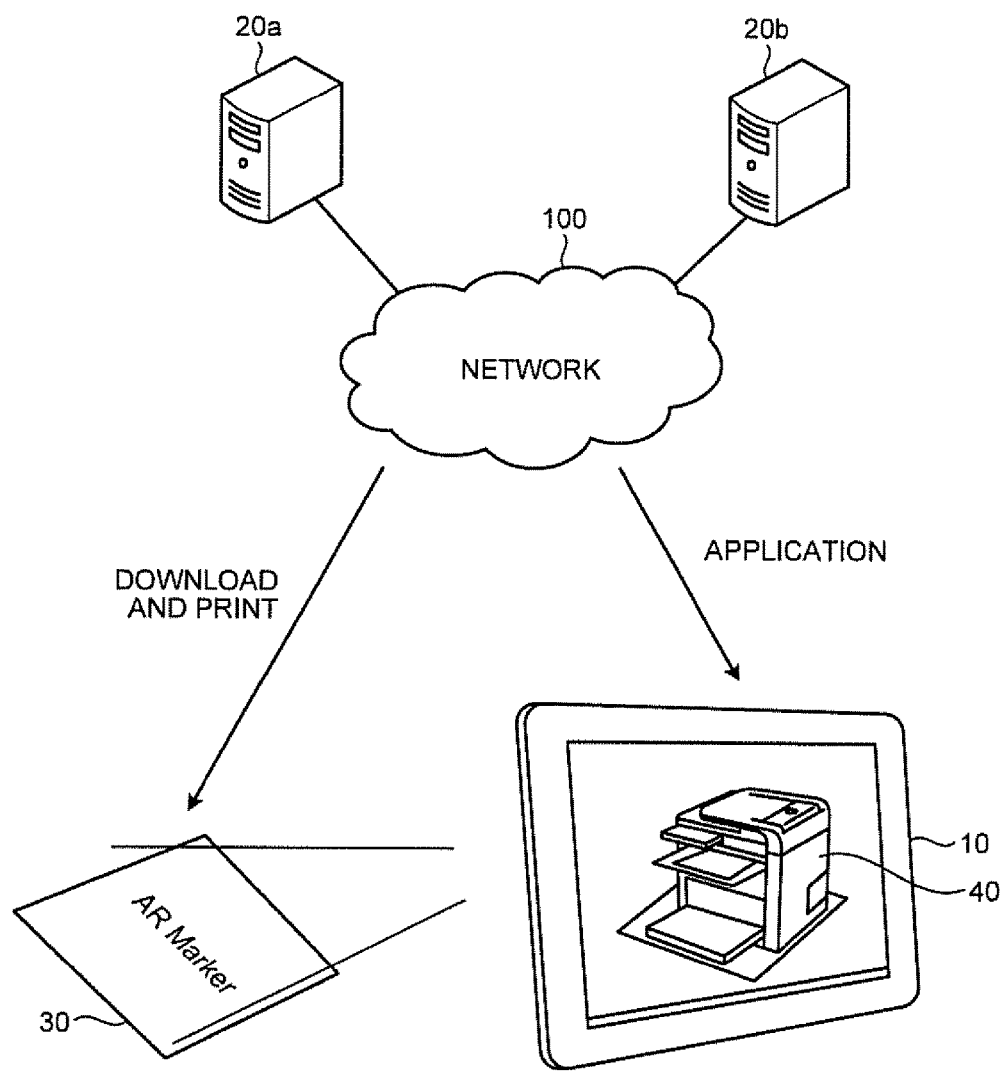
FIG. 2B is a diagram illustrating a second example of the outline of the method of displaying the virtual object according to the first embodiment.

FIG. 2B is a diagram illustrating a second example of an outline of the method of displaying the virtual object 40 according to the first embodiment. The example in FIG. 2B illustrates a case where the server apparatus 20 has been distributed on the network 100 into a server apparatus 20a and a server apparatus 20b. Firstly, a developer of an application stores, in the server apparatus 20a (a server of a company of the developer, or the like), an application, which has, in advance, display setting information including information of image data of the virtual object 40 (model data of an image displayed as the 3D model, or the like) or the like. Subsequently, the application is released, from the server apparatus 20a, to the server apparatus 20b managing an application selling site and the like on the network 100. Subsequently, the information processing device 10 downloads the application from the server apparatus 20b. Thereby, in the example of the configuration in FIG. 2B also, the environment, where the information processing device 10 is able to install the application, is able to formed. The AR marker 30 may be downloaded, as required, from the server apparatus 20a by the information processing device 10.

Next, an outline of the virtual object 40 displayed on the information processing device 10 according to the first embodiment will be described.

Figure 3A:
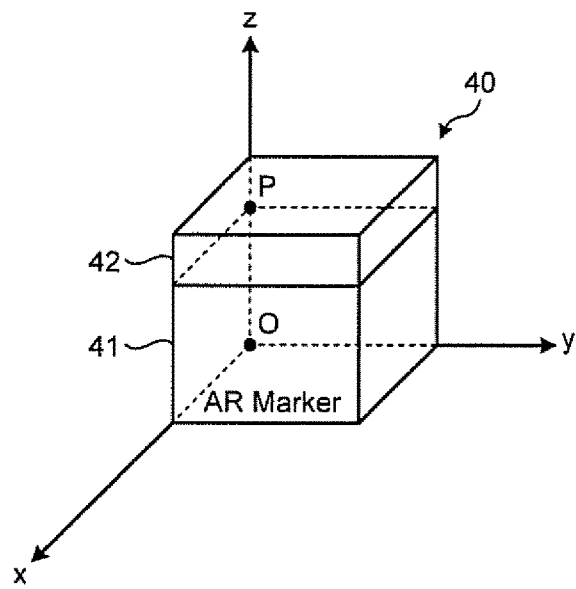
FIG. 3A is a diagram schematically illustrating the virtual object according to the first embodiment.

FIG. 3A is a diagram illustrating an outline of the virtual object 40 according to the first embodiment. The virtual object 40 according to the first embodiment has a first region 41 representing a stationary portion, and a second region 42 representing a movable portion. For simplification, the example of the virtual object 40 in FIGS. 3A and 3B has one second region 42 representing the movable portion, but the number of second regions 42 representing movable portions is arbitrary. The virtual object 40 in FIG. 3A is, for example, a printer, and the second region 42 is, for example, an automatic document feeder (ADF) portion of the printer.

Figure 3B:
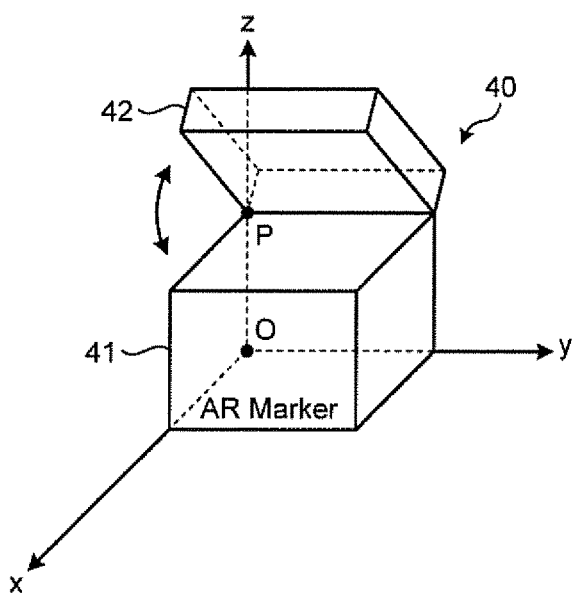
FIG. 3B is a diagram schematically illustrating the virtual object with a movable portion being operated, according to the first embodiment.

FIG. 3B is a diagram illustrating an outline of the virtual object 40 (when the movable portion is operated) according to the first embodiment. The example in FIG. 3B illustrates a case where the second region 42 of the virtual object 40 is able to be opened and closed. The virtual object 40 is firstly displayed on the information processing device 10 in an initial display state of FIG. 3A. When the information processing device 10 receives an input operating the second regions 42, display of the virtual object 40 is changed from the state in FIG. 3A to the state in FIG. 36. Opening and closing operations of the second region 42 then are displayed by use of moving images. The moving image is, for example, an animation. A display reference point P in FIG. 3A and FIG. 3B represents a reference point specifying a position at which the moving image is to be displayed. Coordinates of the display reference point P are represented, for example, by a coordinate system having the origin at a predetermined point O of the virtual object 40.

Next, an example of the configuration of the information processing device 10 according to the first embodiment will be described.

FIG. 4 is a diagram illustrating the example of the configuration of the information processing device 10 according to the first embodiment. The information processing device 10 according to the first embodiment includes a storage unit 11, an image capturing unit 12, display control unit 13, a display unit 14, an operation receiving unit 15, a generating unit 16, a communication unit 17, a GPS unit 18, and an output unit 19. The information processing device 10 may be an arbitrary device, but in describing the first embodiment, the case, where the information processing device 10 is a smart device, such as a smartphone or a tablet-type device, will be described as an example. That is, the display unit 14 and the operation receiving unit 15 are a liquid crystal touch panel, or the like.

The storage unit 11 stores therein display setting information for displaying the virtual object 40, for each type of the virtual object 40. The display setting information includes, for example, initially displayed image information, attachable and detachable portion image information, movable portion image information, and specification information. Further, the storage unit 11 also stores therein information, such as: detailed specification information of the printer corresponding to the virtual object 40; an address of a Web site, from which the printer corresponding to the virtual object 40 is able to be obtained (purchased); and an address of a place (store), from which the printer corresponding to the virtual object 40 is able to be obtained (purchased). The information in the storage unit 11 is updated, by the communication unit 17 communicating with the server apparatus 20. For example, by the communication unit 17 newly obtaining display setting information of the virtual object 40 from the server apparatus 20 and storing the display setting information in the storage unit 11, the virtual object 40 that is new, such as a new product, is able to be displayed on the information processing device 10.

For example, for the case, where the virtual object 40 is the printer, the display setting information (initially displayed image information, attachable and detachable portion image information, movable portion image information, and specification information) will be described.

Firstly, an example of the initially displayed image information according to the first embodiment will be described.

FIG. 5 is a diagram illustrating the example of the initially displayed image information (for the printer), according to the first embodiment. The initially displayed image information indicates a state of when display of the virtual object 40 is started. The initially displayed image information has items including "model name", "main body", "bank", and "finisher". The item, "model name", indicates a name of a model of the printer. In this first embodiment, the item, "model name", is identification information identifying a type of the virtual object 40. The item, "main body", indicates specific information specifying an image of a main body in a state where an attachable and detachable portion (optional part) thereof has not been attached thereto. The specific information is, for example, an image file name. The image of the main body is displayed at the position of the AR marker 30 included in the captured image captured by the information processing device 10.

A bank is an optional part, in which sheets of paper used in printing are stored. For the item, "bank"; "–", "no", or a numerical value, such as "1" or "2", is set. The mark, "–", indicates that a bank is unable to be attached to the main body of the printer. "No" indicates that a bank has not been attached to a model attachable with a bank or banks. The numerical value, "1", indicates that one bank has been attached to a model attachable with a bank or banks. The numerical value, "2", indicates that two banks have been attached to a model attachable with banks. An image depicting a bank is specified by the later described attachable and detachable portion image information.

A finisher is an optional part, which performs processing after printing, such as punching and stapling of printouts. For the item, "finisher"; "–", "no", or "yes" is set. The mark, "–", indicates that a finisher is unable to be attached to the main body of the printer.

indicates that a finisher has not been attached in a model attachable with a finisher. "Yes" indicates that a finisher has been attached in a model attachable with a finisher. An image depicting a finisher is specified by the later described attachable and detachable portion image information.

For example, in the example of FIG. 5, when the virtual object 40 representing a printer B is initially displayed on the information processing device 10, by use of "mainbodyimageB", the virtual object 40 that has not been attached with a bank or a finisher is displayed.

Next, an example of the attachable and detachable portion image information according to the first embodiment will be described.

FIG. 6 is a diagram illustrating the example of the attachable and detachable portion image information (for a bank), according to the first embodiment. The attachable and detachable portion image information in FIG. 6 has items including "model name", "bank", "display reference point", and "maximum number of banks". The item, "model name", indicates a name of a model of the printer. The item, "bank", indicates specific information specifying an image depicting a bank. The specific information is, for example, an image file name. The mark, "−", set in "bank" indicates that a bank is unable to be attached to the main body of the printer. The item, "display reference point", indicates a position at which the image depicting the bank is to be displayed. For example, the information processing device 10 displays an image depicting a bank as a virtual attachable and detachable object, such that an endpoint of the image depicting the bank is positioned at coordinates of the display reference point. The item, "maximum number of banks", indicates the number of banks that are attachable to the main body of the printer. If there are plural types of banks attachable to the main body of the same printer, the storage unit 11 stores therein attachable and detachable portion image information for each of the types of banks.

For example, in an example of the printer B in FIG. 6, an image depicting a bank of the printer B is "bankimageB". Further, a position at which "bankimageB" is to be displayed, is specified by coordinates (x_b6, y_b6, z_b6) of the display reference point. Furthermore, the number of banks attachable to the printer B is three.

FIG. 7 is a diagram illustrating an example of the attachable and detachable portion image information (for a finisher) according to the first embodiment. The attachable and detachable portion image information in FIG. 7 has items including "model name", "finisher", and "display reference point". The item, "model name", indicates a name of a model of the printer. The item, "finisher", indicates specific information specifying an image depicting a finisher. The specific information is, for example, an image file name. The mark, "−", set in the item, "finisher", indicates that a finisher is unable to be attached to the main body of the printer. The item, "display reference point", indicates a position at which the image depicting the finisher is to be displayed. For example, the information processing device 10 displays an image depicting a finisher as the virtual attachable and detachable object, such that an endpoint of the image depicting the finisher is positioned at coordinates of the display reference point. If there are plural types of finishers attachable to the main body of the same printer, the storage unit 11 stores therein attachable and detachable portion image information for each of the types of finishers.

For example, in an example of the printer B in FIG. 7, an image depicting a finisher of the printer B is "finisherimageB". Further, a position at which "finisherimageB" is to be displayed, is specified by coordinates (x_b7, y_b7, z_b7) of the display reference point.

Next, an example of the movable portion image information according to the first embodiment will be described.

FIG. 8 is a diagram illustrating the example of the movable portion image information (for an ADF) according to the first embodiment. The movable portion image information in FIG. 8 has items including "model name", "ADF (open)", "ADF (close)", and "display reference point". The item, "model name", indicates a name of a model of the printer. The item, "ADF (open)", indicates specific information specifying an image (animation) depicting an operation of opening an ADF. The item, "ADF (close)", indicates specific information specifying an image (animation) depicting an operation of closing the ADF. The specific information is, for example, an image file name. The mark, "−", set in the items "ADF (open)" and "ADF (close)" indicates that an ADF is not available in the main body of the printer. The item, "display reference point", indicates a position at which the image (animation) depicting the operation of opening the ADF or the image (animation) depicting the operation of closing the ADF is to be displayed.

For example, in an example of the printer A in FIG. 8, an image (animation) depicting an operation of opening an ADF of the printer A is "ADF_openimageA". Further, an image (animation) depicting an operation of closing the ADF of the printer A is "ADF_closeimageA". Furthermore, a position at which "ADF_openimageA" or "ADF_closeimageA" is to be displayed, is specified by coordinates (x_a1, y_a1, z_a1) of the display reference point.

FIG. 9 is a diagram illustrating an example of the movable portion image information (for a toner cover) according to the first embodiment. The movable portion image information in FIG. 9 has items including "model name", "toner cover (open)", "toner cover (close)", and "display reference point". The item, "model name", indicates a name of a model of the printer. The item, "toner cover (open)", indicates specific information specifying an image (animation) depicting an operation of opening a toner cover. The item, "toner cover (close)", indicates specific information specifying an image (animation) depicting an operation of closing the toner cover. The specific information is, for example, an image file name. The mark, "−", set in the items, "toner cover (open)" and "toner cover (close)", indicates that a toner cover is not available in the main body of the printer. The item, "display reference point", indicates a position at which the image (animation) depicting the operation of opening the toner cover or the image (animation) depicting the operation of closing the toner cover is to be displayed.

For example, in an example of the printer A in FIG. 9, an image (animation) depicting an operation of opening a toner cover of the printer A is "toner_openimageA". Further, an image (animation) depicting an operation of closing the toner cover of the printer A is "toner_closeimageA". Furthermore, a position at which "toner_openimageA" or "toner_closeimageA" is to be displayed, is specified by coordinates (x_a2, y_a2, z_a2) of the display reference point.

FIG. 10 is a diagram illustrating an example of the movable portion image information (for a paper tray) according to the first embodiment. The movable portion image information in FIG. 10 has items including "model name", "paper tray (open)", "paper tray (close)", and "display reference point". The item, "model name", indicates a name of a model of the printer. The item, "paper tray (open)", indicates specific information specifying an image (animation) depicting an operation of opening a paper tray. The item, "paper tray (close)", indicates specific information specifying an image (animation) depicting an operation of closing the paper tray. The specific information is, for example, an image file name. The mark, "−", set in the items, "paper tray (open)" and "paper tray (close)", indicates that a paper tray is not available in the main body of the printer.

The item, "display reference point", indicates a position at which the image (animation) depicting the operation of opening the paper tray or the image (animation) depicting the operation of closing the paper tray is to be displayed.

For example, in an example of the printer A in FIG. 10, an image (animation) depicting an operation of opening a paper tray of the printer A is "tray_openimageA". Further, an image (animation) depicting an operation of closing the paper tray of the printer A is "tray_closeimageA". Furthermore, the position at which "tray_openimageA" or "tray_closeimageA" is to be displayed, is specified by coordinates (x_a3, y_a3, z_a3) of the display reference point.

FIG. 11 is a diagram illustrating an example of the movable portion image information (for a duplex unit cover) according to the first embodiment. The movable portion image information in FIG. 11 has items including "model name", "duplex unit cover (open)", "duplex unit cover (close)", and "display reference point". The item, "model name", indicates a name of a model of the printer. The item, "duplex unit cover (open)", indicates specific information specifying an image (animation) depicting an operation of opening a duplex unit cover. The item, "duplex unit cover (close)", indicates specific information specifying an image (animation) depicting an operation of closing the duplex unit cover. The specific information is, for example, an image file name. The mark, "–", set in the items, "duplex unit cover (open)" and "duplex unit cover (close)", indicates that a duplex unit cover is not available in the main body of the printer. The item, "display reference point", indicates a position at which the image (animation) depicting the operation of opening the duplex unit cover or the image (animation) depicting the operation of closing the duplex unit cover is to be displayed.

For example, in an example of the printer A in FIG. 11, an image (animation) depicting an operation of opening a duplex unit cover of the printer A is "cover_openimageA". Further, an image (animation) depicting an operation of closing the duplex unit cover of the printer A is "cover_closeimageA". Furthermore, the position at which "cover_openimageA" or "cover_closeimageA" is to be displayed, is specified by coordinates (x_a4, y_a4, z_a4) of the display reference point.

FIG. 12 is a diagram illustrating an example of the specification information (for printing operation), according to the first embodiment. The specification information in FIG. 12 has items including "model name", "size", "color/monochrome", "ppm (pages per minute)", "printing operation", and "display reference point". The item, "model name", indicates a name of a model of the printer. The item, "size", indicates a size of a printout. The item, "color/monochrome", indicates colors of the printout. The item, "ppm", indicates the number of printed pages per minute. The item, "printing operation", indicates specific information specifying an image (animation) depicting how the printouts are output from the printer. The specific information is, for example, an image file name. In the example in FIG. 12, the image (animation) used for the printing operation is prepared according to "model name", "size", "color/monochrome", and "ppm". The mark, "–", set in the item, "printing operation", indicates that an image (animation) depicting how the printouts are output from the printer when printing is performed is not available. The item, "display reference point", indicates a position at which the image (amination) depicting how the printouts are output from the printer is to be displayed.

For example, in an example of the printer A in FIG. 12, an image (animation) depicting how printouts are output from the printer A when color printing of size A4 is performed is "printimageAc". "PrintimageAc" depicts how the printouts are output at 18 ppm. Further, the position at which "printimageAc" is to be displayed is specified by coordinates (x_a5, y_a5, z_a5) of the display reference point. Furthermore, an image (animation) depicting how the printouts are output from the printer A when monochrome printing of size A4 is performed is "printimageAm". "PrintimageAm" depicts how the printouts are output at 20 ppm. Moreover, the position at which "printimageAm" is to be displayed is specified by coordinates (x_a5, y_a5, z_a5) of the display reference point.

Returning to FIG. 4, when the image capturing unit 12 captures the captured image including the AR marker 30 indicating the position at which the virtual object 40 is to be displayed, the image capturing unit 12 inputs the captured image into the display control unit 13. The image capturing unit 12 continuously captures the captured image. That is, the captured image is input into the display control unit 13 as a moving image.

When the display control unit 13 receives the captured image from the image capturing unit 12, the display control unit 13 displays a model selection screen having the captured image used as a background of the screen, on the display unit 14.

Figure 13:
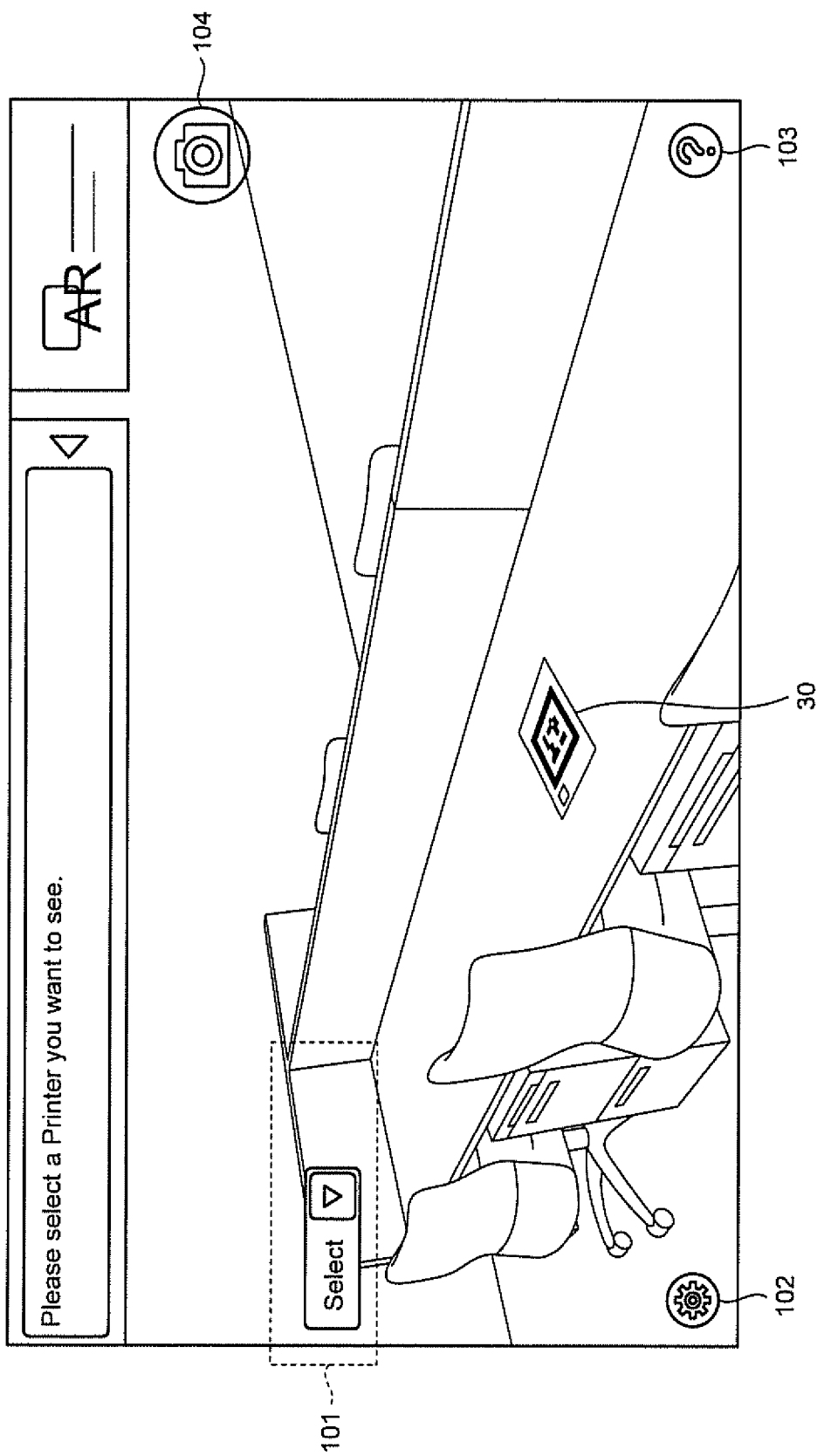
FIG. 13 is a diagram illustrating an example of a model selection screen according to the first embodiment.

FIG. 13 is a diagram illustrating an example of the model selection screen according to the first embodiment. The model selection screen of the first embodiment has a model selection button 101, a setting button 102, a help button 103, and a camera button 104.

The model selection button 101 is a dropdown list for selecting a model of a printer. When the model selection button 101 of the operation receiving unit 15 is pressed down, the display control unit 13 displays a list of model names of printers stored as the above described display setting information in the storage unit 11, on the display unit 14.

The setting button 102 is a button for displaying a setting screen for changing display settings, such as a display language (Japanese, English, Chinese, or the like) and a character size.

The help button 103 is a button for displaying a help screen indicating how to operate.

The camera button 104 is a button for capturing a captured image displayed as a background. If the camera button 104 of the operation receiving unit 15 is pressed down when the virtual object 40 is being displayed, a composite image including the virtual object 40 is stored in the storage unit 11 or the like.

Figure 14:
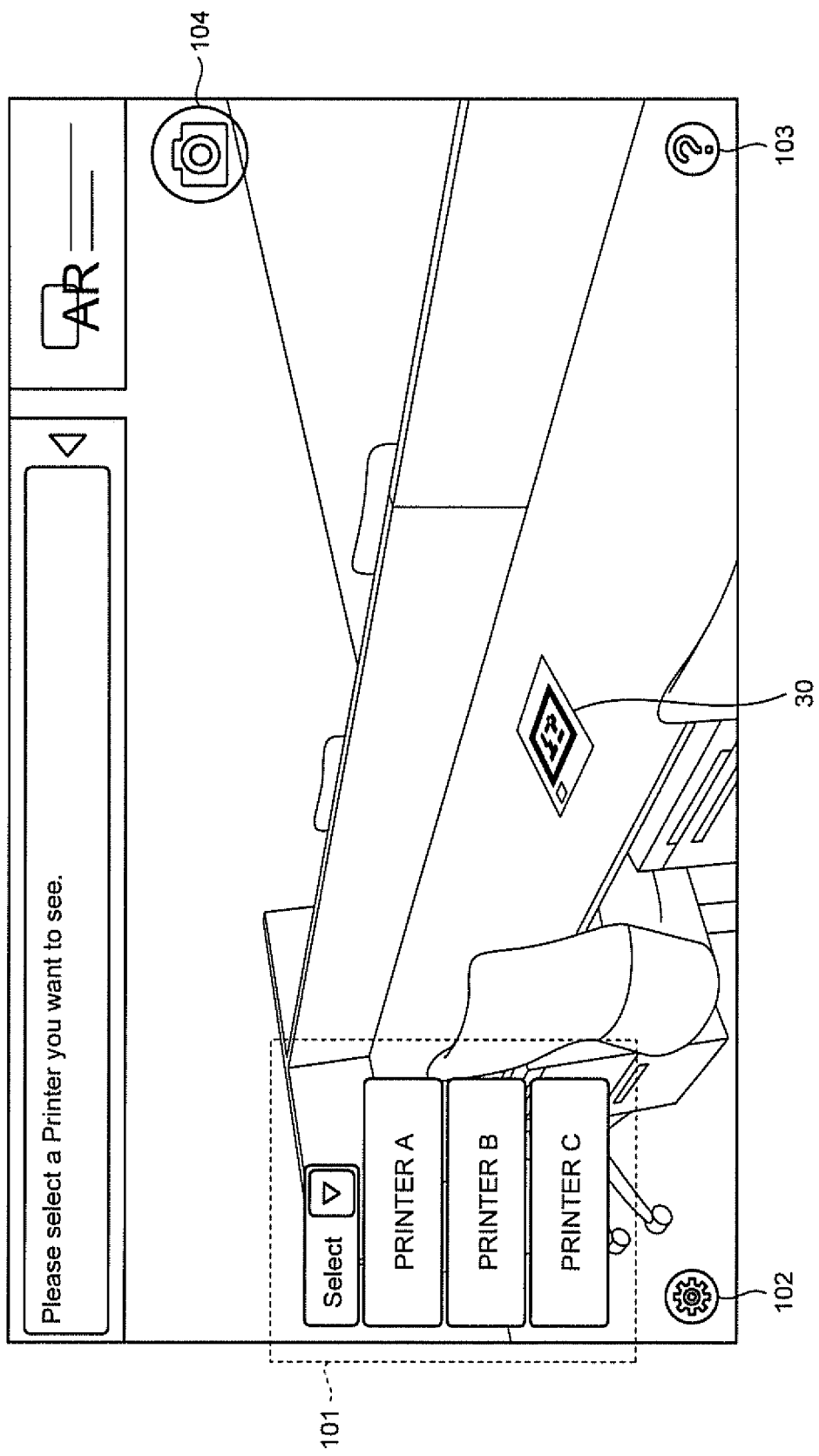
FIG. 14 is a diagram illustrating an example of the model selection screen (when a list is displayed) according to the first embodiment.
Figure 15:
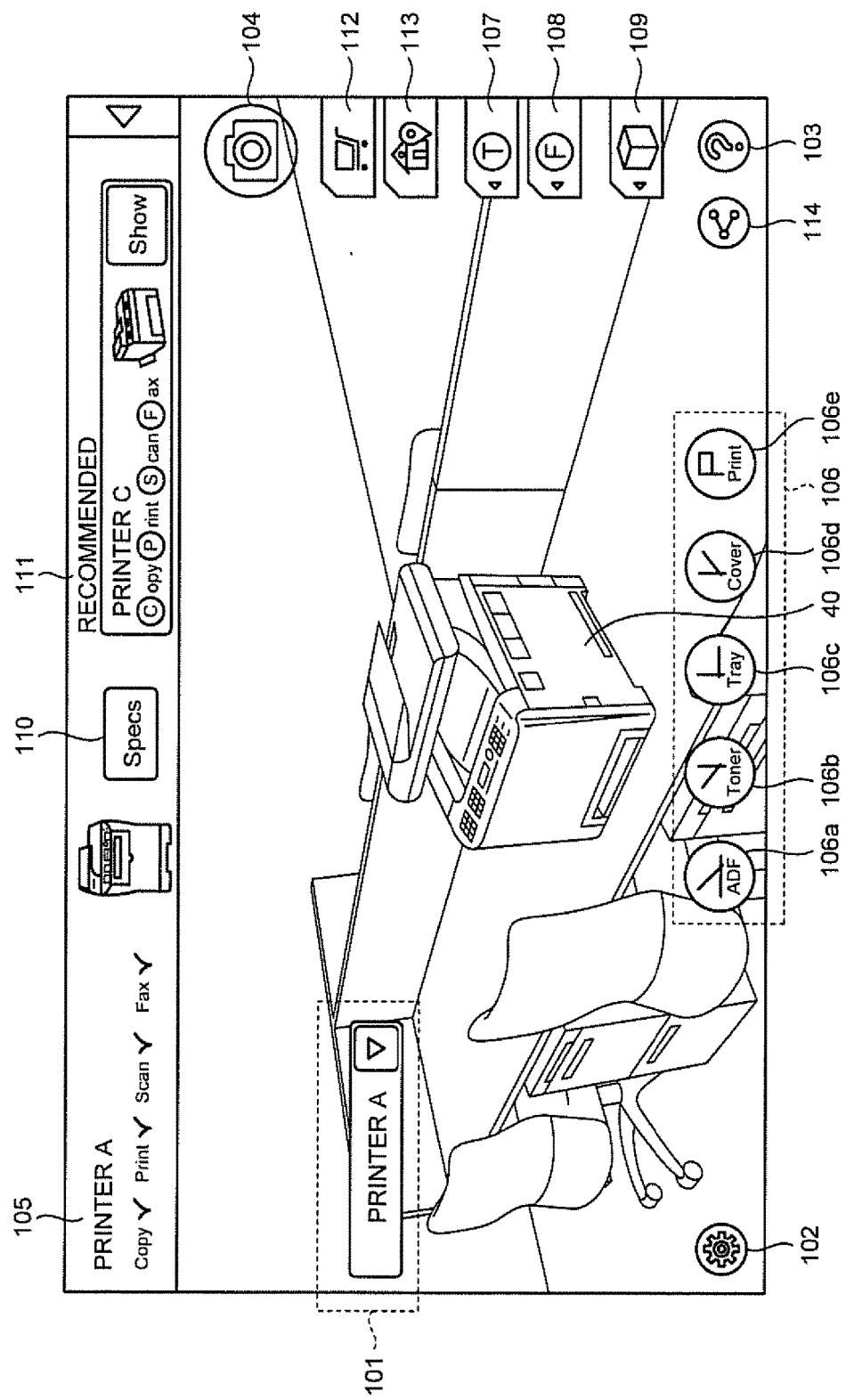
FIG. 15 is a diagram illustrating an example of a model display screen (for a printer A) according to the first embodiment.

FIG. 14 is a diagram illustrating an example of the model selection screen (when the list is displayed) according to the first embodiment. The example in FIG. 14 illustrates a case where the printer A, a printer B, and a printer C are displayed as the list, by the model selection button 101 being pressed down. When the operation receiving unit 15 receives an operation of selecting a model name from the list, the generating unit 16 generates a composite image including an image depicting the virtual object 40 associated with the model name, with the image depicting the virtual object 40 being combined at the position of the AR marker 30 on the captured image. The display control unit 13 then displays a screen on which later described UI parts (various buttons and the like, as seen in FIG. 15) have been added to the composite image, on the display unit 14. For example, if the printer A is selected, the virtual object 40 represented by "mainbodyimageA" of the initially displayed image information (see FIG. 5) included in the display setting information is displayed at the position of the AR marker 30.

The display control unit 13 and the generating unit 16 change how the virtual object 40 looks, according to a positional relation between the image capturing unit 12 of the information processing device 10 and the AR marker 30, using an AR technique. Specifically, firstly, the display control unit 13 detects the AR marker 30 included in the captured image, and determines whether or not how the AR marker 30 looks (at least one of a position and a shape thereof on the captured image) has been changed. If how the AR marker 30 looks has been changed, according to a degree of change in how the AR marker 30 looks, the generating unit 16 performs a change of a display mode (enlargement, reduction, movement, rotation, or the like) of the virtual object 40, and generates a composite image in which the virtual object 40 is combined with the captured image. The display control unit 13 then displays a screen on which the later described UI parts (various buttons and the like, as seen in FIG. 15) have been added to the composite image, on the display unit 14. Thereby, a user of the information processing device 10 is able to see the virtual object 40 from various directions, by turning the image capturing unit 12 to a direction in which the user wants to see the virtual object 40 while referring to the virtual object 40 being three-dimensionally displayed on the display unit 14.

FIG. 15 is a diagram illustrating an example of a model display screen (for the printer A), according to the first embodiment. The model display screen according to the first embodiment has the model selection button 101, the setting button 102, the help button 103, the camera button 104, a model name display section 105, an operation button 106, a bank selection button 107, a finisher selection button 108, a placement restriction region specification button 109, a product specification display button 110, a recommended product display button 111, a product purchase button 112, a map display button 113, and a share button 114.

Since description of the model selection button 101, the setting button 102, the help button 103, and the camera button 104 is the same as the description of FIG. 13, the description will be omitted.

The model name display section 105 displays therein a model name selected by the model selection button 101. Further, functions usable in that model are displayed therein. Specifically, the display control unit 13 obtains the detailed specification information specified by the model name being displayed in the model name display section 105, from the storage unit 11, to display the functions usable in the model, on the display unit 14. The example in FIG. 15 illustrates a case where copying, printing, scanning, and facsimileing are usable in the printer A.

The operation button 106 includes an ADF operation button 106a, a toner cover operation button 106b, a paper tray operation button 106c, a duplex unit operation button 106d, and a printing operation display button 106e.

The ADF operation button 106a is a button for operating opening and closing of the ADF. The ADF operation button 106a causes an operation to be displayed, the operation represented by an image file specified by the movable portion image information (for the ADF) in FIG. 8 included in the display setting information. If an image file is not specified in the movable portion image information (for the ADF), the display control unit 13 does not display the ADF operation button 106a, or displays the ADF operation button 106a with half-brightness (semi-transparency) or the like.

When the ADF operation button 106a is pressed down, the image (animation) depicting the operation of opening the ADF is displayed. Specifically, if the virtual object 40 is the printer A, the image (animation) depicting the operation of opening the ADF is displayed, by use of "ADF_openimageA" of the movable portion image information (see FIG. 8) included in the display setting information.

Figure 16:
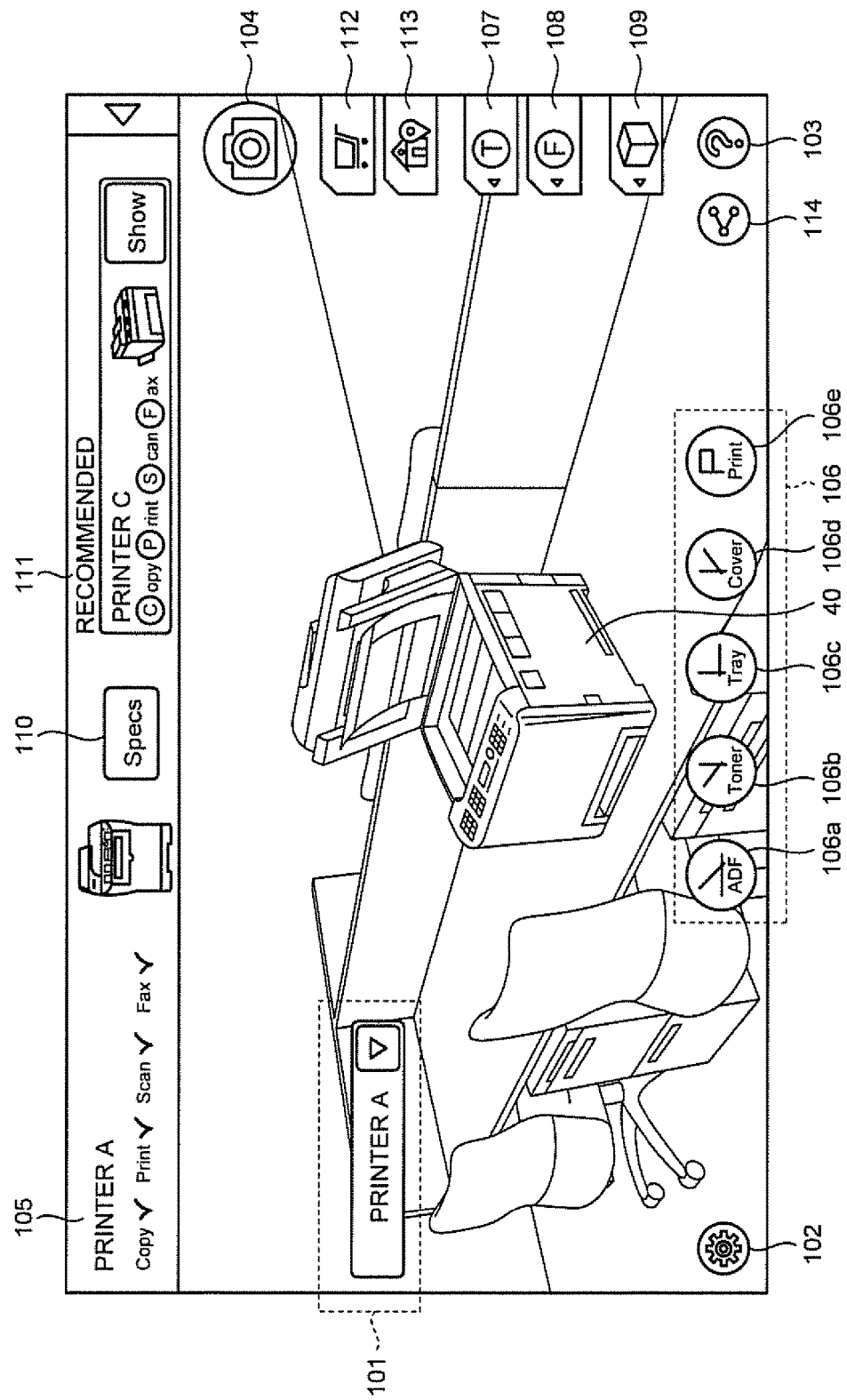
FIG. 16 is a diagram illustrating an example of the model display screen according to the first embodiment, after an ADF operation button has been pressed down.

FIG. 16 is a diagram illustrating an example of the model display screen according to the first embodiment, after the ADF operation button 106a has been pressed down. When the ADF operation button 106a is pressed down again in this state, the image (animation) depicting the operation of closing the ADF is displayed. Specifically, if the virtual object 40 is the printer A, the image (animation) depicting the operation of closing the ADF is displayed, by use of "ADF_closeimageA" of the movable portion image information (see FIG. 8) included in the display setting information, and the display of the printer A is returned to the state illustrated in FIG. 15.

Returning to FIG. 15, the toner cover operation button 106b is a button for operating opening and closing of the toner cover. The toner cover operation button 106b causes an operation to be displayed, the operation represented by an image file specified by the movable portion image information (for the toner cover) in FIG. 9 included in the display setting information. If an image file is not specified in the movable portion image information (for the toner cover), the display control unit 13 does not display the toner cover operation button 106b, or displays the toner cover operation button 106b with half-brightness (semi-transparency), or the like.

When the toner cover operation button 106b is pressed down, the image (animation) depicting the operation of opening the toner cover is displayed. Specifically, if the virtual object 40 is the printer A, the image (animation) depicting the operation of opening the toner cover is displayed, by use of "toner_openimageA" of the movable portion image information (see FIG. 9) included in the display setting information. When the toner cover operation button 106b is pressed down again, the image (animation) depicting the operation of closing the toner cover is displayed. Specifically, if the virtual object 40 is the printer A, the image (animation) depicting the operation of closing the toner cover is displayed, by use of "toner_closeimageA" of the movable portion image information (see FIG. 9) included in the display setting information.

The paper tray operation button 106c is a button for operating opening and closing of the paper tray. The paper tray operation button 106c causes an operation to be displayed, the operation represented by an image file specified by the movable portion image information (for the paper tray) in FIG. 10 included in the display setting information. If an image file is not specified in the movable portion image information (for the paper tray), the display control unit 13 does not display the paper tray operation button 106c, or displays the paper tray operation button 106c with half-brightness (semi-transparency), or the like.

When the paper tray operation button 106c is pressed down, the image (animation) depicting the operation of opening the paper tray is displayed. Specifically, if the virtual object 40 is the printer A, the image (animation) depicting the operation of opening the paper tray is displayed, by use of "tray_openimageA" of the movable portion image information (see FIG. 10) included in the display setting information. When the paper tray operation button 106c is pressed down again, the image (animation) depicting the operation of closing the paper tray is displayed. Specifically, if the virtual object 40 is the printer A, the image (animation) depicting the operation of closing the paper tray is displayed, by use of "tray_closeimageA" of the movable portion image information (see FIG. 10) included in the display setting information.

The duplex unit operation button 106*d* is a button for operating opening and closing of the duplex unit. The duplex unit operation button 106*d* causes an operation to be displayed, the operation represented by an image file specified by the movable portion image information (for the duplex unit) in FIG. 11 included in the display setting information. If an image file is not specified in the movable portion image information (for the duplex unit), the display control unit 13 does not display the duplex unit operation button 106*d*, or displays the duplex unit operation button 106*d* with half-brightness (semi-transparency) or the like.

When the duplex unit operation button 106*d* is pressed down, the image (animation) depicting the operation of opening the duplex unit is displayed. Specifically, if the virtual object 40 is the printer A, the image (animation) depicting the operation of opening the duplex unit is displayed, by use of "cover_openimageA" of the movable portion image information (see FIG. 11) included in the display setting information. When the duplex unit operation button 106*d* is pressed down again, the image (animation) depicting the operation of closing the duplex unit is displayed. Specifically, if the virtual object 40 is the printer A, the image (animation) depicting the operation of closing the duplex unit is displayed, by use of "cover_closeimageA" of the movable portion image information (see FIG. 11) included in the display setting information.

The printing operation display button 106*e* is a button that causes how printouts are output from the printer when printing is performed to be displayed by animation. The printing operation display button 106*e* causes an operation to be displayed, the operation represented by an image file specified by the specification information in FIG. 12 included in the display setting information. If an image file is not specified in the specification information, the display control unit 13 does not display the printing operation display button 106*e*, or displays the printing operation display button 106*e* with half-brightness (semi-transparency) or the like.

Figure 17:
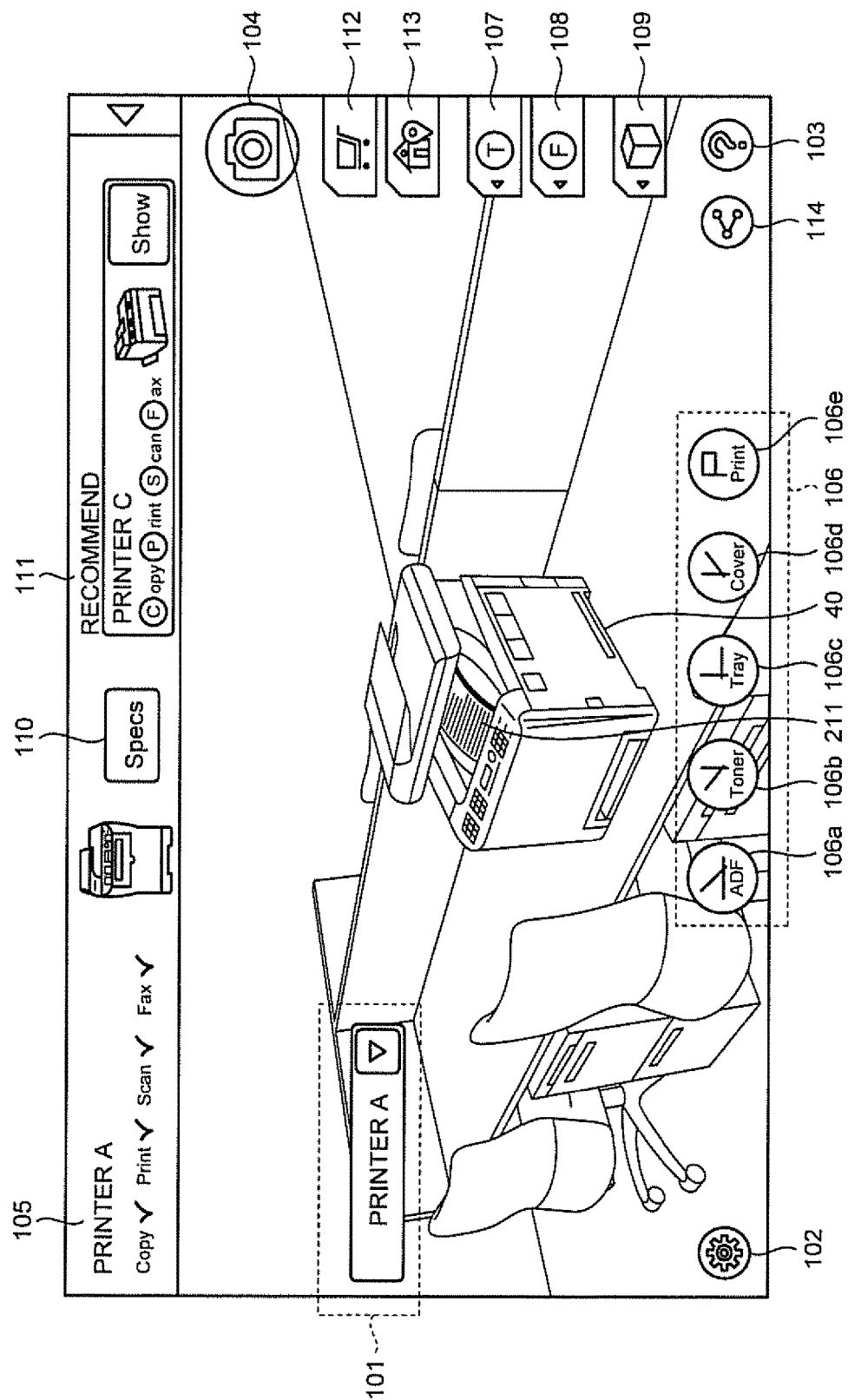
FIG. 17 is a diagram illustrating an example of the model display screen according to the first embodiment, after a printing operation display button has been pressed down.

FIG. 17 is a diagram illustrating an example of the model display screen according to the first embodiment, after the printing operation display button 106*e* has been pressed down. A user is able to feel the printing speed of the printer, by the display control unit 13 displaying an animation of printouts 211 being printed out at a speed corresponding to the printing speed (ppm) included in the specification information (see FIG. 12) of the printer when the printing operation display button 106*e* is pressed down. For example, if, for example, the printing speed of the printer is 30 ppm, the display control unit 13 displays an animation depicting how each sheet of the printouts 211 is output in two seconds from the printer. Further, if, for example, the printing speed of the printer is 20 ppm, the display control unit 13 displays an animation depicting how each sheet of the printouts 211 is output in three seconds from the printer. If sound is included in the animation, the output unit 19 outputs the sound.

The bank selection button 107 is a button that causes a bank selection screen to be displayed. The bank selection screen is a screen for selecting a bank attachable to the model being displayed in the model name display section 105.

FIG. 18A is a diagram illustrating an example of the bank selection screen according to the first embodiment. The display control unit 13 displays the bank selection screen based on the attachable and detachable portion image information (see FIG. 6) included in the display setting information of the model being displayed in the model name display section 105, on the display unit 14. Specifically, if there are plural types of banks for the model being displayed in the model name display section 105, a screen for selecting a type of the banks is displayed by plural images depicting the banks being displayed. Further, if the model being displayed in the model name display section 105 is able to have multiple banks, a screen enabling the number of banks of up to the maximum number of banks indicated in the attachable and detachable portion image information in FIG. 6 to be selected is displayed.

For the attachable and detachable portion image information (see FIG. 6) included in the display setting information of the printer A, since the number of types of banks is one and the maximum number of banks is one, in FIG. 18A, a front face of "bankimageA" is displayed singly.

Figure 18B:
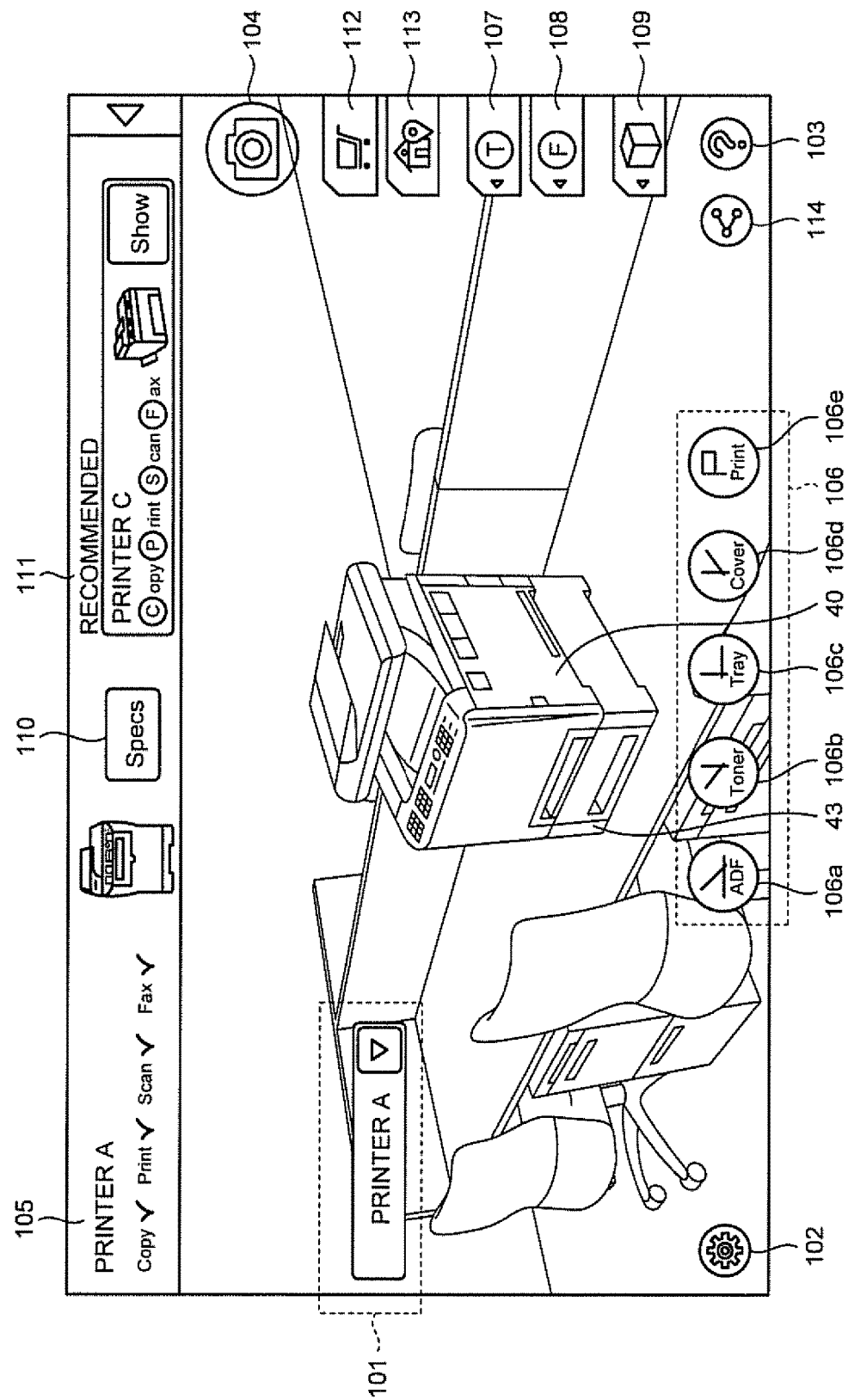
FIG. 18B is a diagram illustrating an example of the model display screen according to the first embodiment, after a bank has been selected.

FIG. 18B is a diagram illustrating an example of the model display screen according to the first embodiment, after the bank has been selected. When the operation receiving unit 15 receives an operation indicating selection of the bank on the bank selection screen in FIG. 18A, as illustrated in FIG. 18B, a virtual attachable and detachable object 43 representing the bank is added to the virtual object 40 representing the main body of the printer A. Specifically, the composite image in which "mainbodyimageA" is combined with the captured image, is further combined with "bankimageA" to form a composite image, which is displayed by the display control unit 13 on the display unit 14. Thereby, a user is able to more clearly get a grasp of the image of the case where the attachable and detachable portion (optional part) has been attached to the main body of the printer A.

Returning to FIG. 15, the finisher selection button 108 is a button for causing a finisher selection screen to be displayed. Since description of the finisher selection screen is similar to the description of the bank selection screen, the description of the finisher selection screen will be omitted.

The placement restriction region specification button 109 is a button for causing a placement restriction region specification screen to be displayed. The placement restriction region specification screen is a screen for specifying a placement restriction region representing restriction on a region, in which an object corresponding to the virtual object 40 is to be placed.

Figure 19:
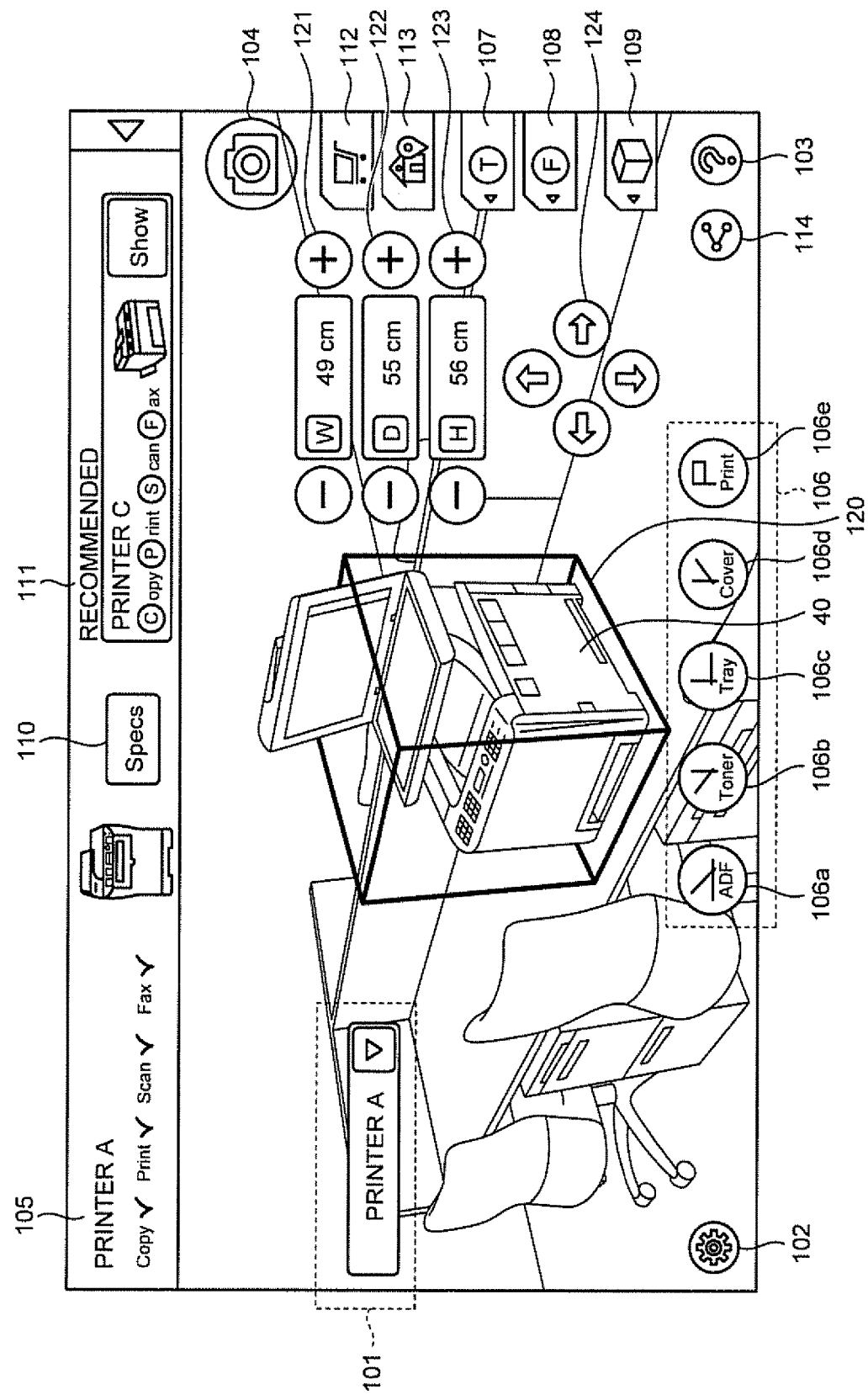
FIG. 19 is a diagram illustrating an example of a placement restriction region specification screen according to the first embodiment.

FIG. 19 is a diagram illustrating an example of the placement restriction region specification screen according to the first embodiment. The placement restriction region specification screen according to the first embodiment further has, in addition to the display on the screen in FIG. 15, a frame 120, a width specification button 121, a depth specification button 122, a height specification button 123, and a frame movement button 124.

The frame 120 represents size of the placement restriction region. Width, depth, height, and displayed position of the frame 120 are changed, according to operation on the width specification button 121, the depth specification button 122, the height specification button 123, and the frame movement button 124.

Specifically, if "+" of the width specification button 121 is pressed down, the width of the frame 120 is widened, and if "−" of the width specification button 121 is pressed down, the width of the frame 120 is narrowed. Similarly, if "+" of the depth specification button 122 is pressed down, the depth of the frame 120 is increased, and if "−" of the depth specification button 122 is pressed down, the depth of the frame 120 is decreased. Similarly, if "+" of the height specification button 123 is pressed down, the height of the frame 120 is increased, and if "−" of the height specification button 123 is pressed down, the height of the frame 120 is decreased.

A user interface for specifying the width, depth, and height of the frame 120 may be arbitrary. For example, the display control unit 13 may display a number input unit in a ten-key arrangement on the display unit 14, and the operation receiving unit 15 may receive input of numbers indicating the width, depth, and height.

Further, if the frame movement button 124 is pressed down, according to the direction pressed down, the frame 120 moves upward, downward, rightward, or leftward on the background image (captured image) of the placement restriction region specification screen.

The display control unit 13 changes a display mode of the frame 120 representing the placement restriction region, when the virtual object 40 does not fit in the placement restriction region represented by the frame 120. A method of changing the display mode may be arbitrary. The method of changing the display mode includes, for example, changing the color of the line representing the frame 120, changing the thickness of the line representing the frame 120, or causing the line representing the frame 120 to blink.

For example, in the example of FIG. 19, the display control unit 13 displays the frame 120 in yellow, since the virtual object 40 representing the printer A with the ADF closed fits in the frame 120. On the contrary, since the virtual object 40 representing the printer A with the ADF open does not fit in the frame 120, the display control unit 13 displays the frame 120 in red. Thereby, a user is able to more clearly get a grasp of an image of whether or not the virtual object 40 fits in an arbitrary region to be placed represented by the frame 120 when the movable portion of the printer A is operated in the region to be placed.

Returning to FIG. 15, the product specification display button 110 is a button, which causes a product specification screen to be displayed, the product specification screen displaying detailed specification information specified by the model name being displayed in the model name display section 105.

Figure 20:
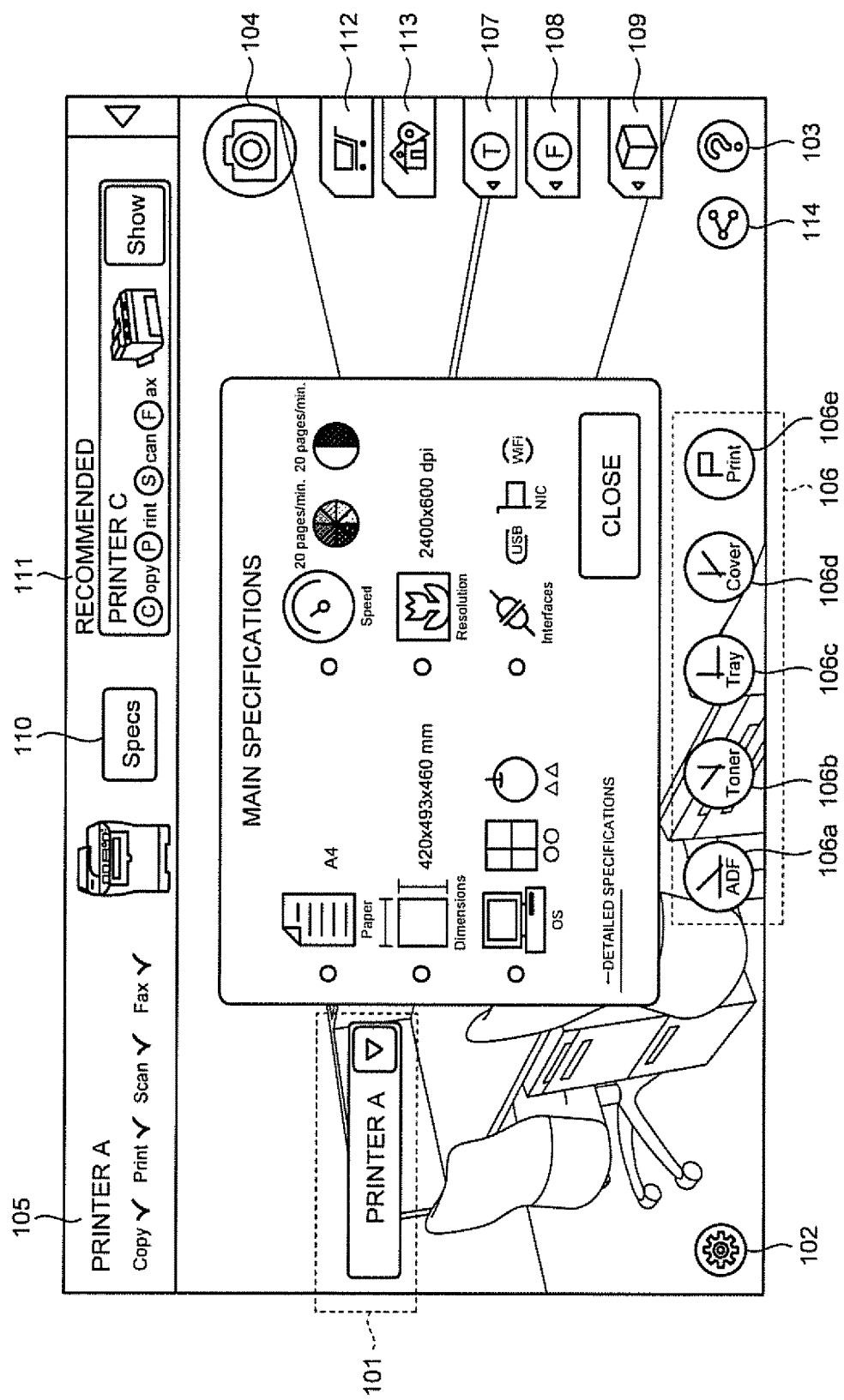
FIG. 20 is a diagram illustrating an example of a product specification screen according to the first embodiment.

FIG. 20 is a diagram illustrating an example of the product specification screen according to the first embodiment. When the operation receiving unit 15 receives an operation indicating that the product specification display button 110 has been pressed down, the display control unit 13 obtains detailed specification information of the model being displayed in the model name display section 105, from the storage unit 11, and displays the product specification screen including the detailed specification information, on the display unit 14. The detailed specification information includes, for example, the maximum printing size, dimensions of the printer, a compatible OS, a printing speed, a resolution, and a compatible interface.

Further, the display control unit 13 displays a detailed specification link for displaying a Web page displaying detailed specifications, on the product specification screen. When the operation receiving unit 15 receives an operation indicating that the detailed specification link has been pressed down, the display control unit 13 displays a Web site obtained by the communication unit 17 accessing an address indicated by the detailed specification link, on the display unit 14.

Returning to FIG. 15, the recommended product display button 111 is a button for displaying a model display screen for a model recommended to a user. The model to be recommended to the user is, for example, a model having product specifications similar to the model being displayed in the model name display section 105. When the operation receiving unit 15 receives an operation indicating that the recommended product display button 111 has been pressed down, the generating unit 16 generates a composite image including the captured image and a main body image of initially displayed image information included in display setting information of the model to be recommended to the user, the main body image combined at the position of the AR marker 30 on the captured image. The display control unit 13 then displays a model display screen corresponding to the composite image, on the display unit 14.

The product purchase button 112 is a button for displaying a Web site, from which the model being displayed in the model name display section 105 is able to be purchased. When the operation receiving unit 15 receives an operation indicating that the product purchase button 112 has been pressed down, the communication unit 17 obtains an address of the Web site from which the model being displayed in the model name display section 105 is able to be purchased, from the storage unit 11. The display control unit 13 then displays the Web site obtained by the communication unit 17 accessing the address, on the display unit 14.

The map display button 113 is a button for displaying a map display screen indicating a position of a store, from which the model being displayed in the model name display section 105 is able to be purchased.

Figure 21:
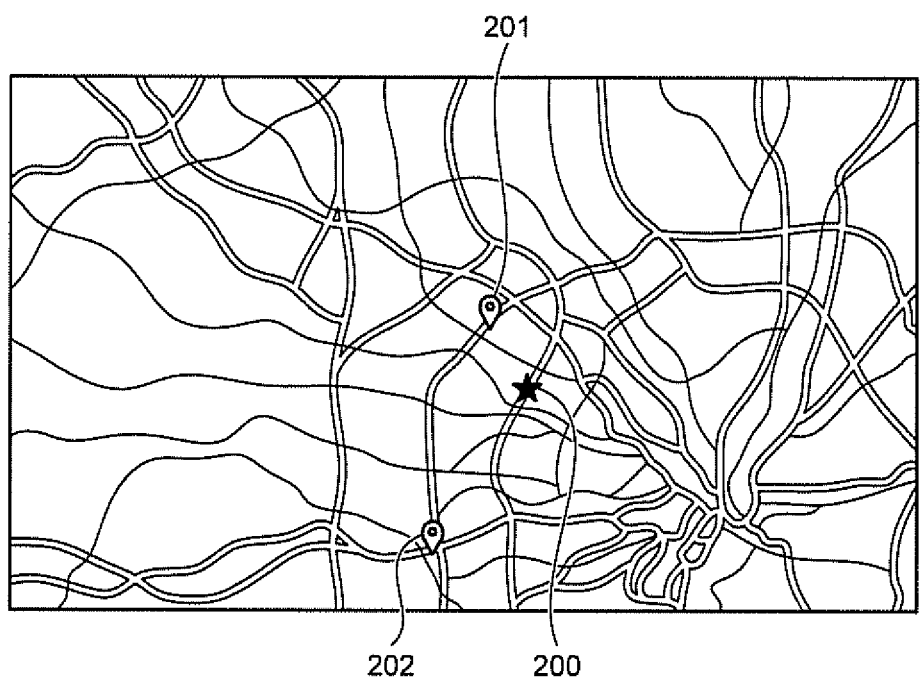
FIG. 21 is a diagram illustrating an example of a map display screen according to the first embodiment.

FIG. 21 is a diagram illustrating an example of the map display screen according to the first embodiment. When the operation receiving unit 15 receives an operation indicating that the map display button 113 has been pressed down, the GPS unit 18 obtains a current position 200 of the information processing device 10. When the display control unit 13 displays a map around the current position 200 on the display unit 14, and the store, from which the model being displayed in the model name display section 105 is able to be purchased, is present around the current position 200, the position of the store is clearly indicated on the map display screen. The example of FIG. 21 illustrates a case where positions of a store 201 and a store 202 are clearly indicated on the map display screen.

Returning to FIG. 15, the share button 114 is for pop-up displaying a list of sharing applications, such as Facebook (registered trademark) and Twitter (registered trademark). When the operation receiving unit 15 receives an operation indicating selection of a sharing application, information and the like displayed on the display unit 14 is able to be shared with another user by use of the sharing application.

Next, an example of an information processing method according to the first embodiment will be described.

Figure 22:
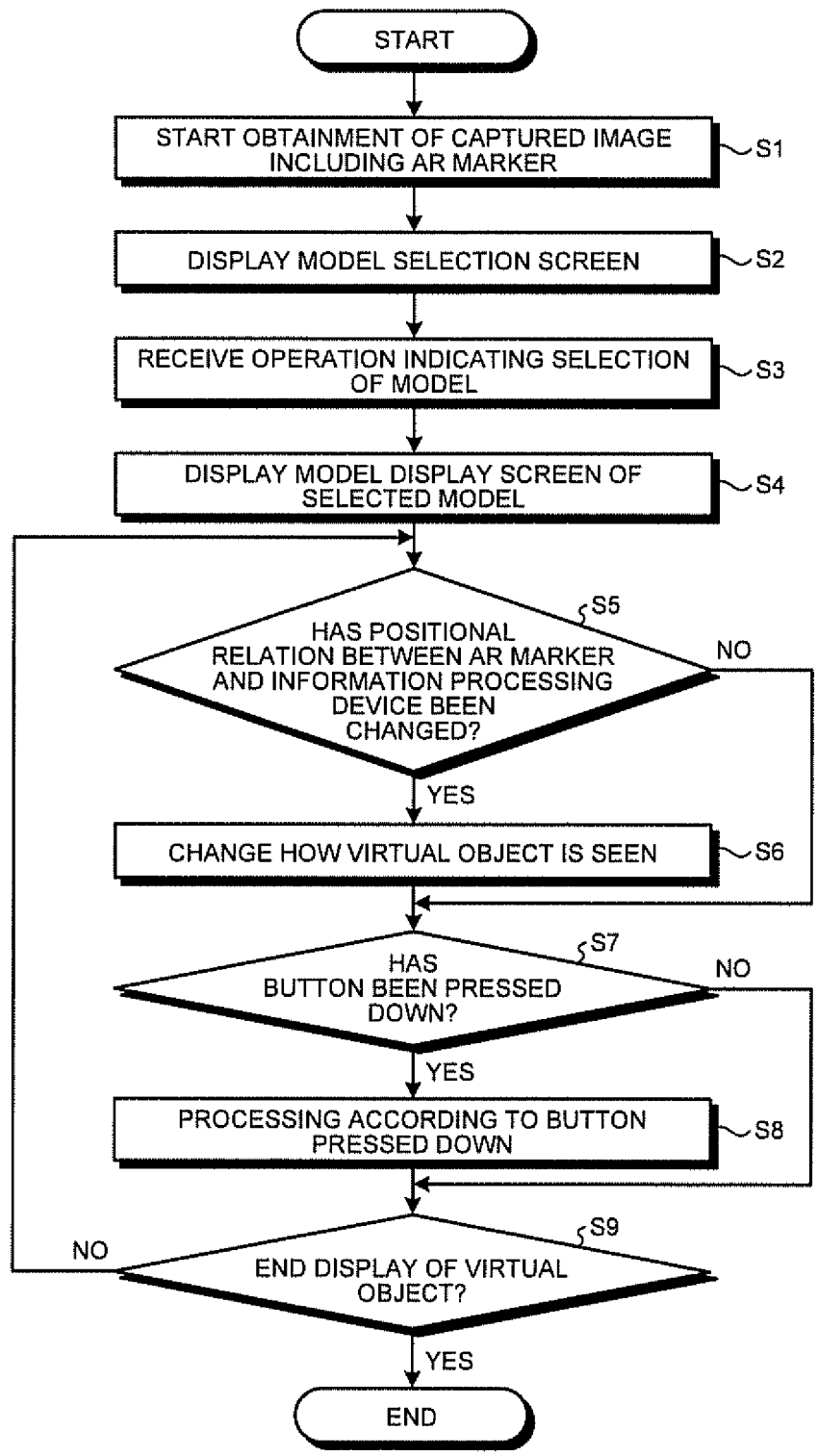
FIG. 22 is a flow chart illustrating an example of an information processing method according to the first embodiment.

FIG. 22 is a flow chart illustrating an example of the information processing method according to the first embodiment. Firstly, the image capturing unit 12 starts capturing a captured image including the AR marker 30 indicating a position at which the virtual object 40 is to be displayed (Step S1).

Next, when the display control unit 13 receives the captured image from the image capturing unit 12, the display control unit 13 displays the model selection screen (see FIG. 13) on which the captured image is used as a background of the screen, on the display unit 14 (Step S2). Next, the operation receiving unit 15 receives the operation of selecting a model name from the dropdown list of the model selection button 101 (Step S3).

Next, the display control unit 13 displays the model display screen (see FIG. 15) of the model identified by the model name selected in Step S3, on the display unit 14 (Step S4). Specifically, the generating unit 16 first generates a composite image including the image depicting the virtual object 40 associated with the model name selected in Step S3, the image combined at the position of the AR marker 30 on the captured image. The display control unit 13 then displays the screen on which the UI parts such as various buttons have been added to the composite image, on the display unit 14.

Next, the display control unit 13 determines whether or not the positional relation between the image capturing unit 12 of the information processing device 10 and the AR marker 30 has been changed (Step S5). Specifically, the display control unit 13 detects the AR marker 30 included in the captured image, and determines whether or not the positional relation between the image capturing unit 12 of the information processing device 10 and the AR marker 30 has been changed, based on whether or not how the AR marker 30 looks (at least one of a position and a shape thereof on the captured image) has been changed.

If the positional relation between the image capturing unit 12 and the AR marker 30 has been changed (Step S5; Yes), the display control unit 13 changes how the virtual object 40 looks, according to the changed positional relation, by use of the AR technique (Step S6). If the positional relation between the image capturing unit 12 and the AR marker 30 has not been changed (Step S5; No), the processing is advanced to Step S7.

Next, the operation receiving unit 15 determines whether or not a button on the model display screen (see FIG. 15) has been pressed down (Step S7).

If a button has been pressed down (Step S7; Yes), the information processing device 10 executes the above described processing corresponding to the various buttons (Step S8). For example, if the printing operation display button 106e on the model display screen has been pressed down, the display control unit 13 displays the animation (see FIG. 17) of printing the printouts 211 at the speed corresponding to the printing speed (ppm) included in the specification information (see FIG. 12) of the printer. If a button has not been pressed down (Step S7; No), the processing is advanced to Step S9.

Next, the operation receiving unit 15 determines whether or not an operation of ending the processing related to the display of the virtual object 40 has been received (Step S9). If the ending operation has not been received (Step S9; No), the processing is advanced to Step S5. If the ending operation has been received (Step S9; Yes), the processing is ended.

Next, an example of a hardware configuration of the information processing device 10 according to the first embodiment will be described.

Figure 23:
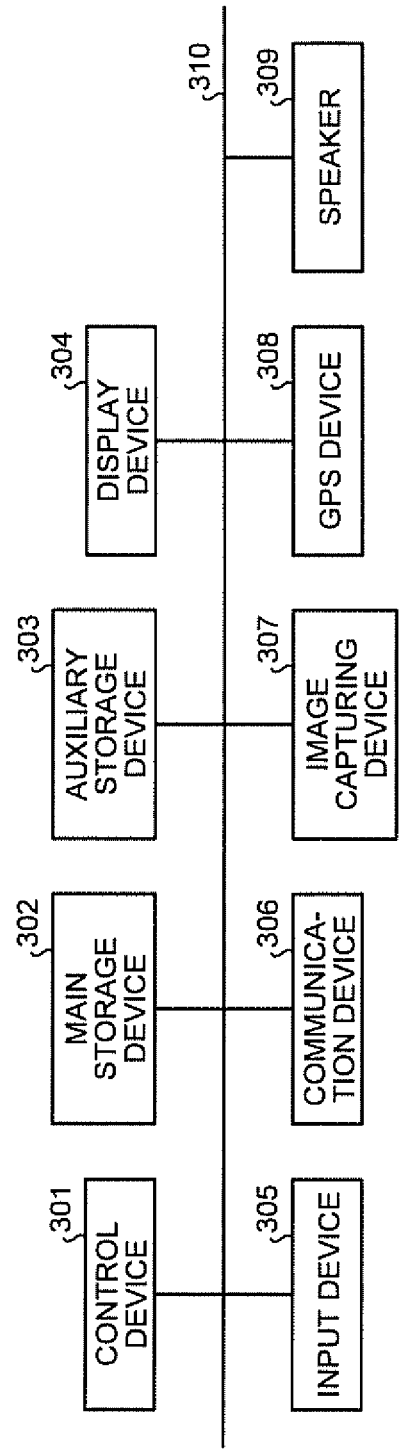
FIG. 23 is a diagram illustrating an example of a hardware configuration of the information processing device according to the first embodiment.

FIG. 23 is a diagram illustrating the example of the hardware configuration of the information processing device 10 according to the first embodiment. The information processing device 10 according to the first embodiment includes a control device 301, a main storage device 302, an auxiliary storage device 303, a display device 304, an input device 305, a communication device 306, an image capturing device 307, a GPS device 308, and a speaker 309. The control device 301, the main storage device 302, the auxiliary storage device 303, the display device 304, the input device 305, the communication device 306, the image capturing device 307, the GPS device 308, and the speaker 309 are connected to one another via a bus 310.

The control device 301 executes a computer program read out to the main storage device 302 from the auxiliary storage device 303. The main storage device 302 is a memory, such as a ROM or a RAM. The auxiliary storage device 303 is a memory card, or the like. The storage unit 11 in FIG. 4 corresponds to the main storage device 302 and the auxiliary storage device 303.

The display device 304 and the input device 305 are a liquid crystal touch panel having a display function and an input function. The communication device 306 communicates with another device. The image capturing device 307 captures a captured image depicting a state of surroundings of the information processing device 10. The GPS device 308 receives signals from plural GPS satellites to obtains GPS information indicating position of the information processing device 10. The speaker 309 outputs sound.

The computer program executed in the information processing device 10 is stored in a computer readable storage medium, such as a CD-ROM, a memory card, a CD-R, or a digital versatile disk (DVD), in a file of an installable format or executable format, to be provided as a computer program product.

Further, the computer program executed in the information processing device 10 may be configured to be stored on a computer connected to a network, such as the Internet, and to downloaded via the network, to be provided. Further, the computer program executed in the information processing device 10 may be configured to be provided via the network, such as the Internet, without being downloaded.

Further, the computer program of the information processing device 10 may be configured to be incorporated in advance in a ROM, or the like, to be provided.

The computer program executed in the information processing device 10 has a module configuration including functional blocks that are able to be realized by the computer program, from among the above described respective functional blocks. The functional blocks that are able to be realized by the computer program are, for example, the display control unit 13, the operation receiving unit 15, the generating unit 16, and the communication unit 17. As to actual hardware, the control device 301 reads out and executes the computer program from the storage medium, such as the auxiliary storage device 303, to thereby load, on the main storage device 302, the functional blocks realized by the computer program. That is, the functional blocks realized by the computer program are generated on the main storage device 302.

A part or all of the functional blocks that are able to be realized by the computer program may be realized by hardware, such as an integrated circuit, without being realized by the computer program.

As described above, in the information processing device 10 according to the first embodiment, the image capturing unit 12 obtains a captured image including the AR marker 30 (position identification information) identifying a position at which the virtual object 40 representing a printer is to be displayed. Further, the generating unit 16 generates a composite image in which the virtual object 40 is combined at the position identified by the AR marker 30 included in the captured image. Further, the operation receiving unit 15 receives an operation causing the virtual object 40 to operate, the virtual object 40 included in the composite image displayed on the display unit 14. When the operation receiving unit 15 receives the operation causing the virtual object 40 to operate, the display control unit 13 then controls, based on the display setting information including the specification information defining the specifications of the printer, the display depicting the operation of the virtual object 40. Thereby, a user is able to more clearly get a grasp of an image of a case where the printer is operated.

In describing the first embodiment, although the case, where the speed information is included in the specification information, has been described as an example, the speed information indicating the operation speed of the function that the target to be placed has; the target to be placed may be an arbitrary apparatus, not being limited to the printer.

Second Embodiment

Next, the second embodiment will be described. The case where the object corresponding to the virtual object 40 is a projector will be described in describing the second embodiment. In describing the second embodiment, any description similar to the first embodiment will be omitted, and portions different from the first embodiment will be described.

A configuration of the information processing system 1 according to the second embodiment is the same as the configuration of the information processing system 1 according to the first embodiment (see FIG. 1). A configuration of the information processing device 10 according to the second embodiment is the same as the configuration of the information processing device 10 according to the first embodiment (see FIG. 4).

Display setting information (initially displayed image information and specification information) according to the second embodiment will be described first.

FIG. 24 is a diagram illustrating an example of the initially displayed image information (for a projector), according to the second embodiment. The initially displayed image information indicates a state of when display of the virtual object 40 representing a projector is started. The initially displayed image information has items, "model name" and "main body". The item, "model name", indicates a name of a model of the projector. In the second embodiment, the item, "model name", is identification information identifying a type of the virtual object 40. The item, "main body", indicates specific information specifying an image depicting the projector. The specific information is, for example, an image file name. The image of the main body is displayed at the position of the AR marker 30 included in the captured image captured by the information processing device 10.

For example, in the example of FIG. 24, when the virtual object 40 representing a projector Pa is initially displayed on the information processing device 10, the virtual object 40 is displayed by use of "mainbodyimagePa".

Next, an example of the specification information according to the second embodiment will be described.

FIG. 25 is a diagram illustrating the example of the specification information (for projection operation), according to the second embodiment. The specification information in FIG. 25 has items including "model name", "brightness [lm]", "size", "distance [m]", "projection operation", and "display reference point". The item, "model name", indicates a name of a model of the projector. The item, "brightness", indicates a brightness of an image projected by the projector. The item, "size", indicates a size of the image projected by the projector. The item, "distance", indicates a distance between the projector and the image projected by the projector. The item, "projection operation", indicates specific information specifying an image (animation) depicting how the image is projected from the projector. The specific information is, for example, an image file name. The item, "display reference point", indicates a position at which the image (animation) depicting how the image is projected from the projector is to be displayed.

For example, in an example of the projector Pa in FIG. 25, the image (animation) depicting how an image of a size of Type 40 is projected from the projector Pa is "projectionimagePa1". "ProjectionimagePa1" depicts how the image of the size of Type 40 is projected with a brightness of 3600 lm to a location 1.23 m away from the projector Pa. The position at which "projectionimagePa1" is to be displayed, is specified by coordinates (x_pa1 , y_pa1, z_pa1) of the display reference point. Further, an image (animation) depicting how an image of a size of Type 100 is projected from the projector Pa is "projectionimagePa3". "ProjectionimagePa3" depicts how the image of the size of Type 100 is projected with a brightness of 3600 lm to a location 3.15 m away from the projector Pa. Further, the position at which "projectionimagePa3" is to be displayed, is specified by coordinates (x_pa3, y_pa3, z_pa3) of the display reference point.

Figure 26:
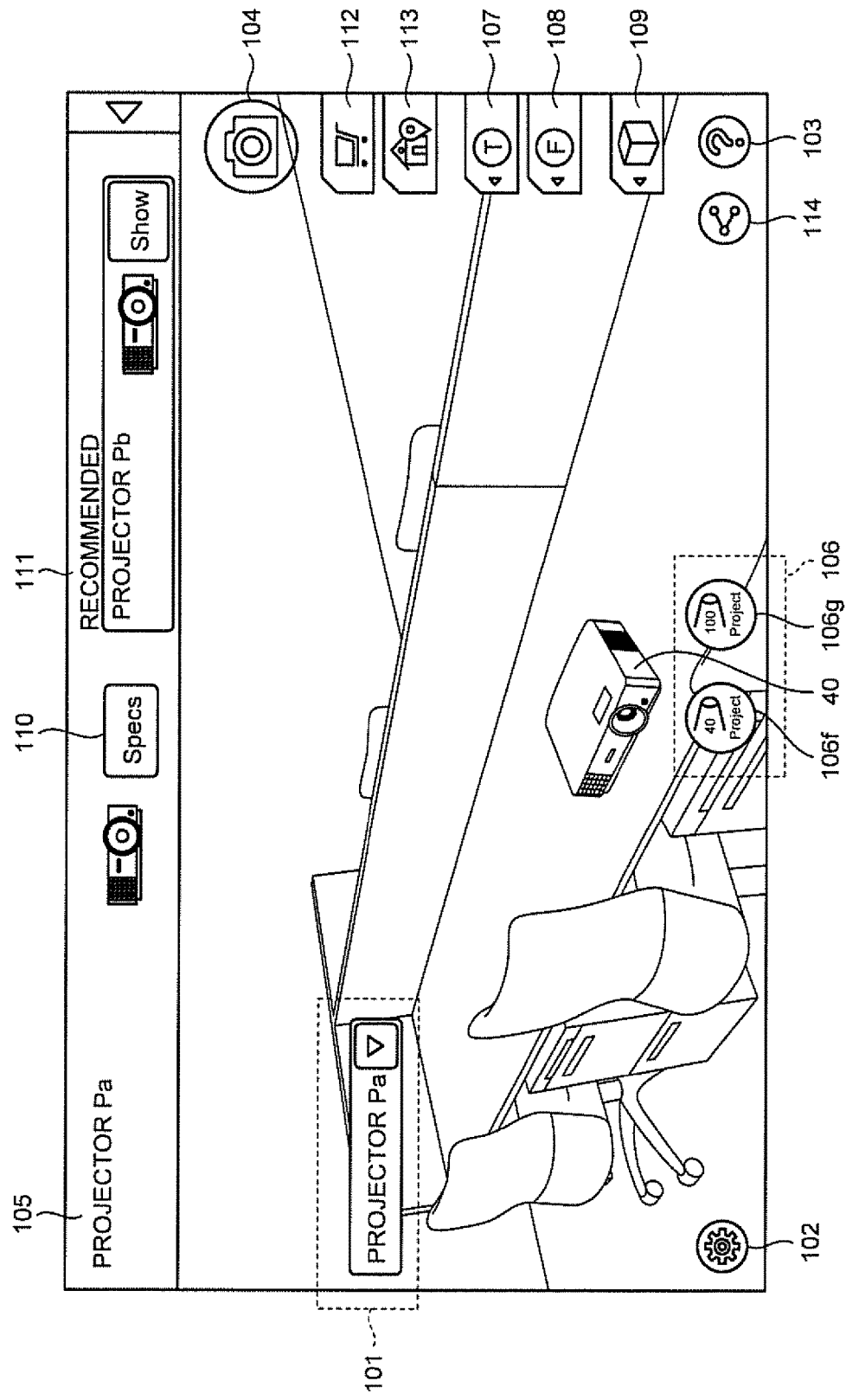
FIG. 26 is a diagram illustrating an example of a model display screen (for a projector Pa) according to the second embodiment.

FIG. 26 is a diagram illustrating an example of a model display screen (for the projector Pa), according to the second embodiment. The model display screen according to the second embodiment has the model selection button 101, the setting button 102, the help button 103, the camera button 104, the model name display section 105, the operation button 106, the placement restriction region specification button 109, the product specification display button 110, the recommended product display button 111, the product purchase button 112, the map display button 113, and the share button 114.

Since description of the model selection button 101, the setting button 102, the help button 103, and the camera button 104 is the same as the description of FIG. 13, the description will be omitted.

The model name display section 105 displays therein a model name selected by the model selection button 101. In the example of FIG. 26, the projector Pa is being displayed therein.

The operation button 106 includes a projection button 106f for a Type 40 image and a projection button 106g for a Type 100 image.

The projection button 106f for a Type 40 image is for displaying a projection operation represented by "projectionimagePa1". The projection button 106f for a Type 100 image is for displaying a projection operation represented by "projectionimagePa3".

Figure 27:
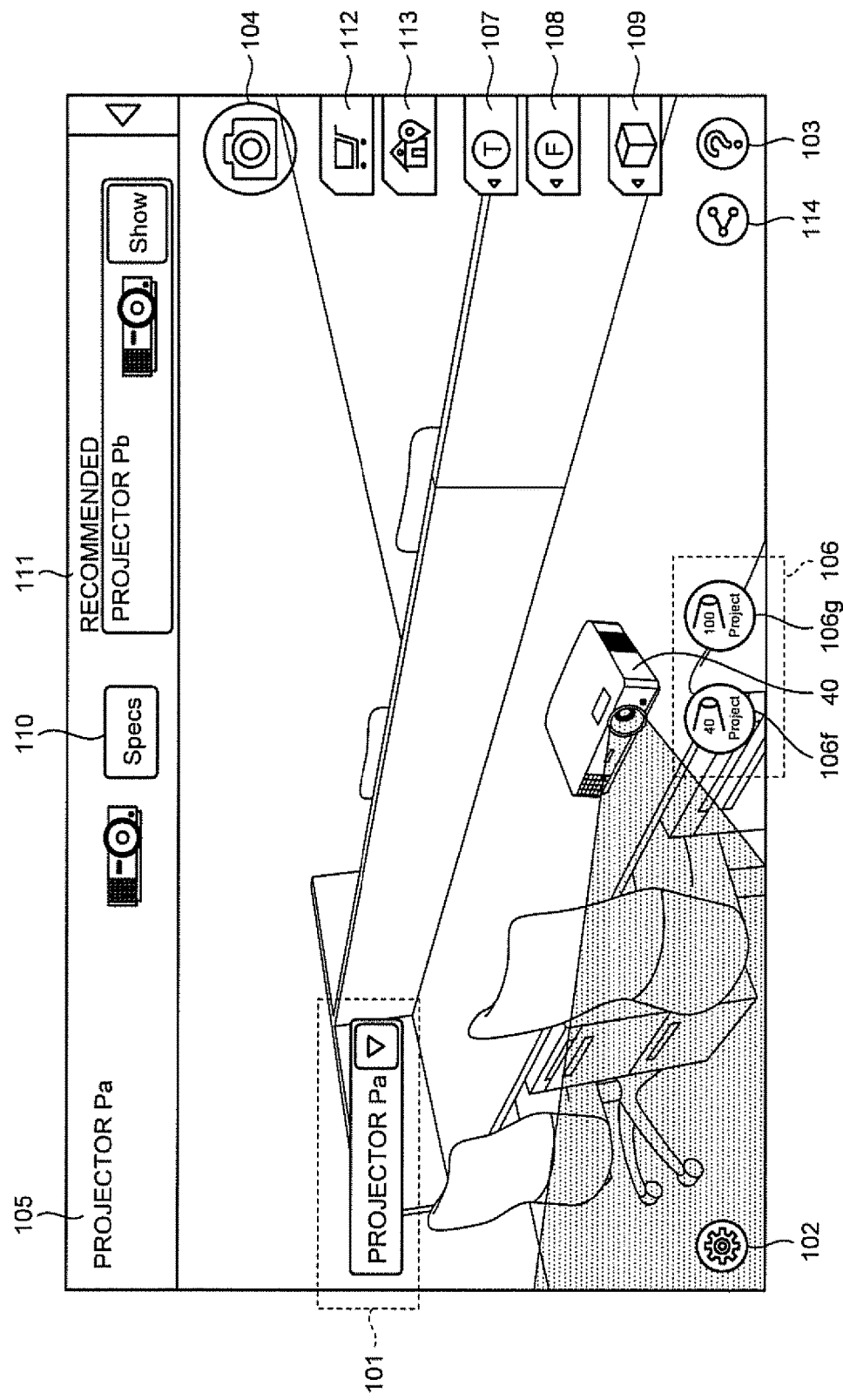
FIG. 27 is a diagram illustrating an example of the model display screen according to the second embodiment, after an operation button according to the second embodiment has been pressed down.

FIG. 27 is a diagram illustrating an example of the model display screen according to the second embodiment, after the operation button 106 according to the second embodiment has been pressed down. When the operation button 106 is pressed down, a moving image (animation) is displayed, the moving image depicting how an image is projected with a brightness according to the specification information defining the specifications of the projector Pa. When the operation button 106 is pressed down again, the display of the moving image (animation) is ended, the moving image depicting how the image is projected with the brightness according to the specification information defining the specifications of the projector Pa.

Figure 28A:
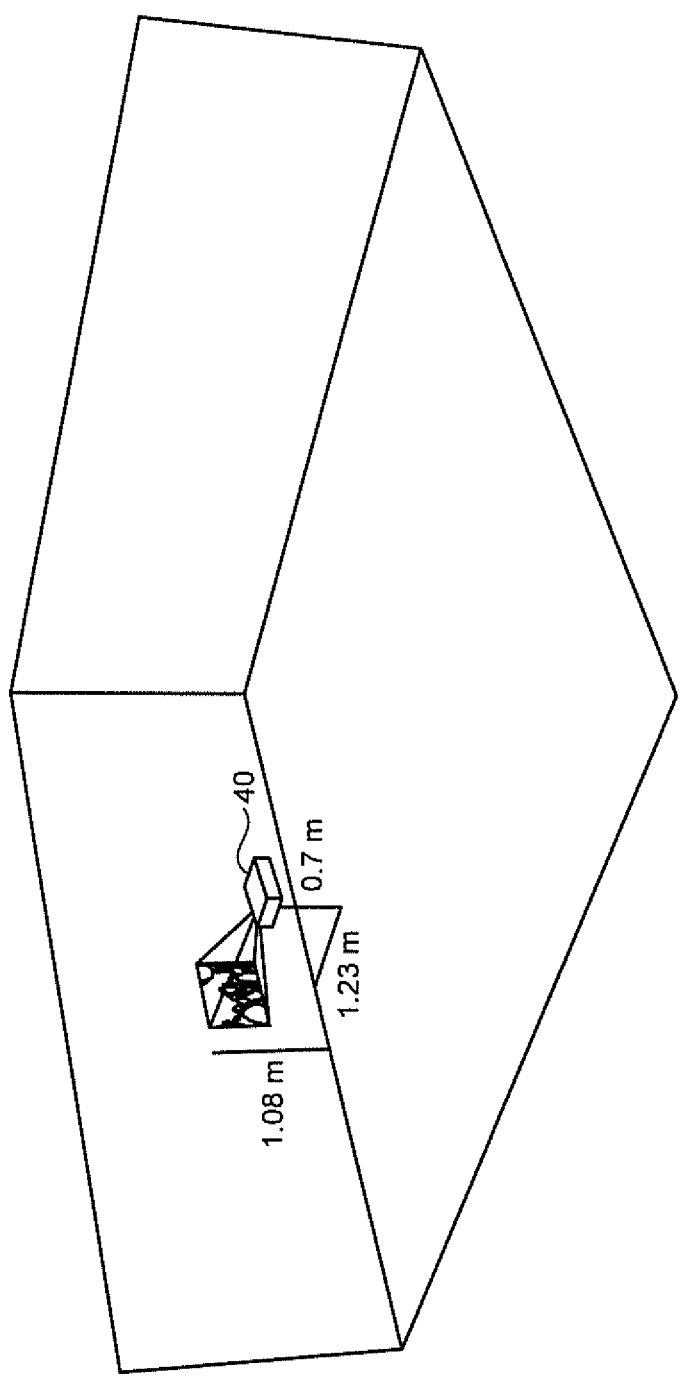
FIG. 28A is a schematic diagram illustrating an example of a projection image (for Type 40) according to the second embodiment.

FIG. 28A is a schematic diagram illustrating an example of "projectionimagePa1" (for Type 40) according to the second embodiment. FIG. 28B is a schematic diagram illustrating an example of "projectionimagePa3" (for Type 100) according to the second embodiment. As illustrated in FIG. 2BA and FIG. 2BB, by a moving image (animation) being displayed, the moving image depicting how an image is projected from the virtual object 40 representing the projector Pa in a space represented by the captured image; a user is able to more clearly get a grasp of an image of the operation of the projector Pa.

The placement restriction region specification button 109 is a button for displaying a placement restriction region specification screen. The placement restriction region specification screen is a screen for specifying a placement restriction region representing restriction on a region, in which an object corresponding to the virtual object 40 is to be placed. The placement restriction region specification screen according to the second embodiment is similar to the placement restriction region specification screen (see FIG. 19) according to the first embodiment, and thus, description thereof will be omitted.

The product specification display button 110 is a button for displaying a product specification screen displaying detailed specification information specified by the model name being displayed in the model name display section 105. The product specification screen according to the second embodiment is similar to the product specification screen (see FIG. 20) according to the first embodiment, and thus, description thereof will be omitted.

The recommended product display button 111 is a button for displaying a model display screen for a model to be recommended to a user. The model to be recommended to the user is, for example, a model having product specifications that are similar to the model being displayed in the model name display section 105. When the operation receiving unit 15 receives an operation indicating that the recommended product display button 111 has been pressed down, the generating unit 16 generates a composite image including a main body image of initially displayed image information included in display setting information of the model to be recommended to the user, the main body image combined at the position of the AR marker 30 on the captured image. The display control unit 13 then displays a model display screen corresponding to the composite image, on the display unit 14.

The product purchase button 112 is a button for displaying a Web site, from which the model being displayed in the model name display section 105 is able to be purchased. When the operation receiving unit 15 receives an operation indicating that the product purchase button 112 has been pressed down, the communication unit 17 obtains an address of the Web site from which the model being displayed in the model name display section 105 is able to be purchased, from the storage unit 11. The display control unit 13 then displays the Web site obtained by the communication unit 17 accessing the address, on the display unit 14.

The map display button 113 is for displaying a map display screen displaying a position of a store, from which the model being displayed in the model name display section 105 is able to be purchased. The map display screen according to the second embodiment is similar to the map display screen (see FIG. 21) according to the first embodiment, and thus, description thereof will be omitted.

The share button 114 is for pop-up displaying a list of sharing applications, such as Facebook (registered trademark) and Twitter (registered trademark). When the operation receiving unit 15 receives an operation indicating selection of a sharing application, information and the like displayed on the display unit 14 is able to be shared with another user by use of the sharing application.

An information processing method according to the second embodiment is similar to the information processing method (see FIG. 22) according to the first embodiment, and thus, description thereof will be omitted. Further, a hardware configuration of the information processing device 10 according to the second embodiment is the same as the hardware configuration of the information processing device 10 according to the first embodiment (see FIG. 23), and thus description thereof will be omitted.

As described above, in the information processing device 10 according to the second embodiment, the generating unit 16 generates a composite image including the virtual object 40 representing a projector, the virtual object 40 combined at a position identified by the AR marker 30 included in the captured image. Further, the operation receiving unit 15 receives the operation of causing the virtual object 40 to operate, the virtual object 40 included in the composite image displayed on the display unit 14. When the operation receiving unit 15 receives the operation of causing the virtual object 40 to operate, the display control unit 13 then controls, based on the display setting information including the specification information defining the specifications of the projector, the display depicting the operation of the virtual object 40. Thereby, a user is able to more clearly get a grasp of an image of a case where the projector is operated.

In describing the second embodiment, although the case, where the brightness information is included in the specification information when the target to be placed is a projector, has been described as an example, the brightness information indicating the brightness of the function that the target to be placed has; the target to be placed may be an arbitrary apparatus, not being limited to the projector.

Third Embodiment

Next, a third embodiment will be described. A case, where the object corresponding to the virtual object 40 is a washing machine, will be described in describing the third embodiment. In describing the third embodiment, any description similar to the first embodiment will be omitted, and portions different from the first embodiment will be described.

A configuration of the information processing system 1 according to the third embodiment is the same as the configuration of the information processing system 1 according to the first embodiment (see FIG. 1). Further, a configuration of the information processing device 10 according to the third embodiment is the same as the configuration of the information processing device 10 according to the first embodiment (see FIG. 4).

Firstly, display setting information (initially displayed image information, movable portion image information, and specification information) according to the third embodiment will be described.

FIG. 29 is a diagram illustrating an example of the initially displayed image information (for a washing machine), according to the third embodiment. The initially displayed image information indicates a state of when display of the virtual object 40 representing a washing machine is started. The initially displayed image information has items, "model name" and "main body". The item, "model name", indicates a name of a model of the washing machine. In the third embodiment, the item, "model name", is identification information identifying a type of the virtual object 40. The item, "main body", indicates specific information specifying an image depicting the washing machine. The specific information is, for example, an image file name. The image of the main body is displayed at the position of the AR marker 30 included in the captured image captured by the information processing device 10.

For example, in the example of FIG. 29, when the virtual object 40 representing a washing machine Wa is initially displayed on the information processing device 10, the virtual object 40 is displayed by use of "mainbodyimageWa".

Next, an example of the movable portion image information according to the third embodiment will be described.

FIG. 30 is a diagram illustrating an example of the movable portion image information (for a door), according to the third embodiment. The movable portion image information in FIG. 30 has items including "model name", "door (open)", "door (close)", and "display reference point". The item, "model name", indicates a name of a model of the washing machine. The item, "door (open)", indicates specific information specifying an image (animation) depicting an operation of opening a door. The item, "door (close)", indicates specific information specifying an image (animation) depicting an operation of closing the door. The specific information is, for example, an image file name. The item, "display reference point", indicates a position at which the image (animation) depicting the operation of opening the door or the image (animation) depicting the operation of closing the door is to be displayed.

For example, in an example of the washing machine Wa in FIG. 30, an image (animation) depicting an operation of opening a door is "door_openimageWa". Further, an image (animation) depicting an operation of closing the door is "door_closeimageWa". Furthermore, the position at which "door_openimageWa" or "door_closeimageWa" is to be displayed, is specified by coordinates (x_wa, y_wa, z_wa) of the display reference point.

Next, an example of the specification information according to the third embodiment will be described.

FIG. 31 is a diagram illustrating the example of the specification information (for washing operation), according to the third embodiment. The specification information in FIG. 31 has items including "model name", "operation sound (dB)", "washing operation", and "display reference point". The item, "model name", indicates a name of a model of the washing machine. The item, "washing operation", indicates specific information specifying an image (animation) depicting how laundry is washed by rotation of a washing tub of the washing machine. The specific information is, for example, an image file name. The item, "display reference point", indicates a position at which the image (animation) depicting how the laundry is washed by the rotation of the washing tub of the washing machine is to be displayed.

For example, in an example of the washing machine Wa in FIG. 31, the image (animation) depicting how the laundry is washed by the rotation of the washing tub of the washing machine is "washingimageWa". "WashingimageWa" depicts how the laundry is washed by the rotation of the washing tub of the washing machine, together with a sound volume corresponding to an operation sound of 30 dB. Further, a position at which "washingimageWa" is to be displayed, is specified by the coordinates (x_wa, y_wa, z_wa) of the display reference point.

Next, an example of a model selection screen according to the third embodiment will be described.

Figure 32:
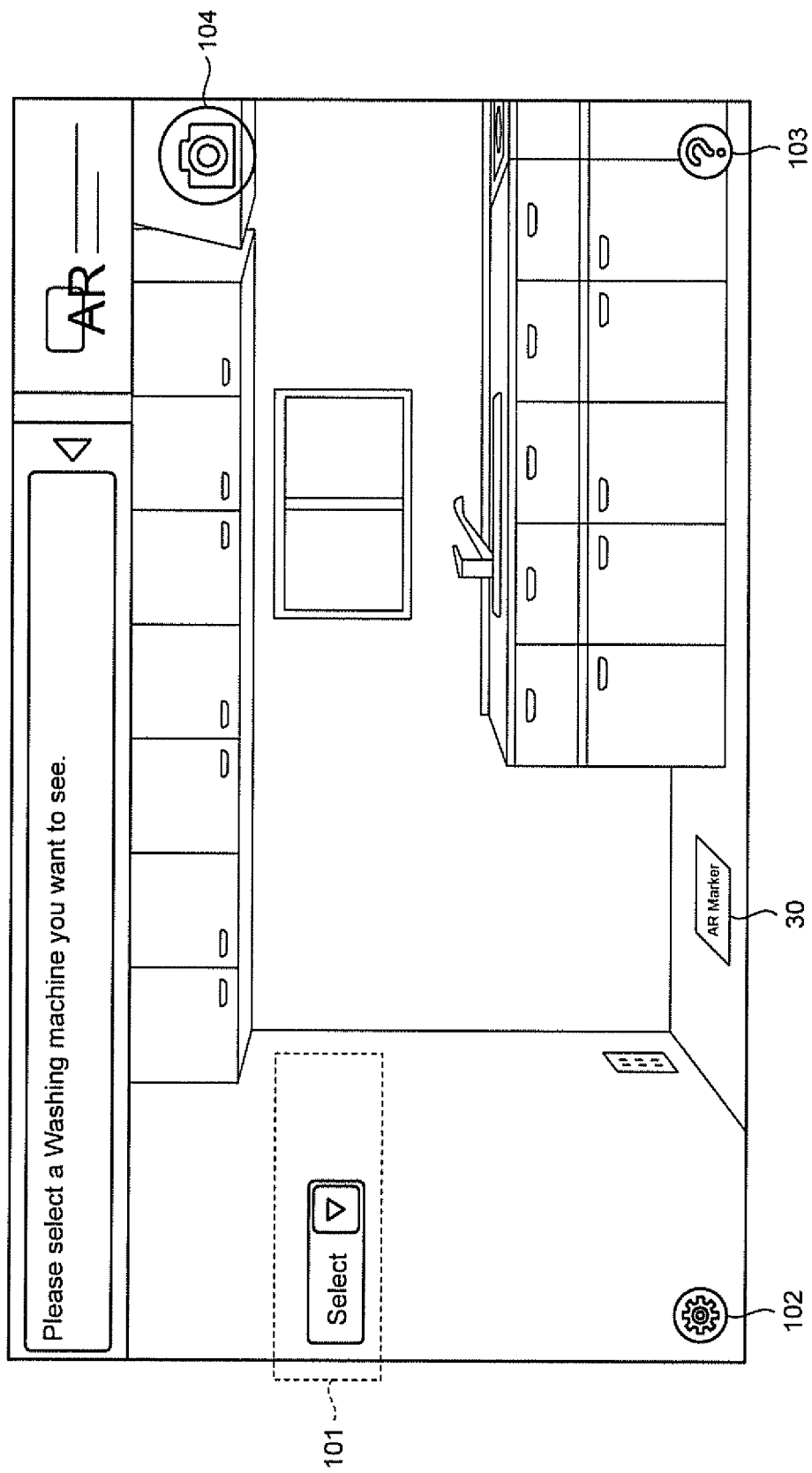
FIG. 32 is a diagram illustrating an example of a model selection screen according to the third embodiment.

FIG. 32 is a diagram illustrating the example of the model selection screen according to the third embodiment.

The model selection screen according to the third embodiment has the model selection button 101, the setting button 102, the help button 103, and the camera button 104.

The model selection button 101 is a dropdown list, from which a model of a washing machine is selected. When the model selection button 101 of the operation receiving unit 15 is pressed down, the display control unit 13 displays a list of model names of washing machines stored, as the above described display setting information, in the storage unit 11, on the display unit 14.

The setting button 102 is a button for displaying a setting screen for changing display settings, such as a display language (Japanese, English, Chinese, or the like) and a character size.

The help button 103 is a button for displaying a help screen indicating how to operate.

The camera button 104 is a button for capturing a captured image displayed as a background. When the camera button 104 of the operation receiving unit 15 is pressed down in a state where the virtual object 40 depicting a washing machine is being displayed at a position of the AR marker 30, a composite image including the virtual object 40 depicting the washing machine is stored in the storage unit 11 or the like.

Figure 33:
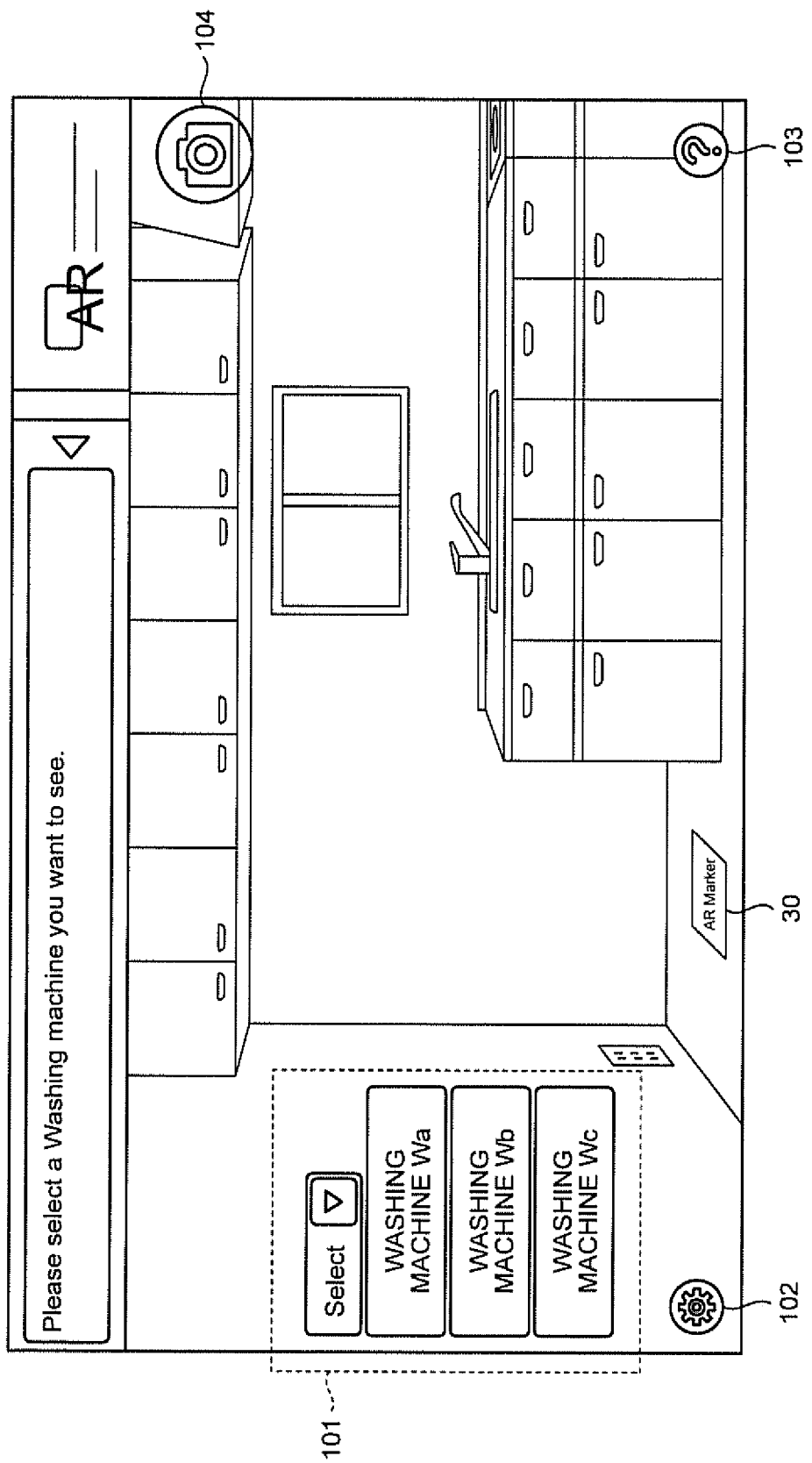
FIG. 33 is a diagram illustrating an example of the model selection screen (when a list is displayed) according to the third embodiment.
Figure 34:
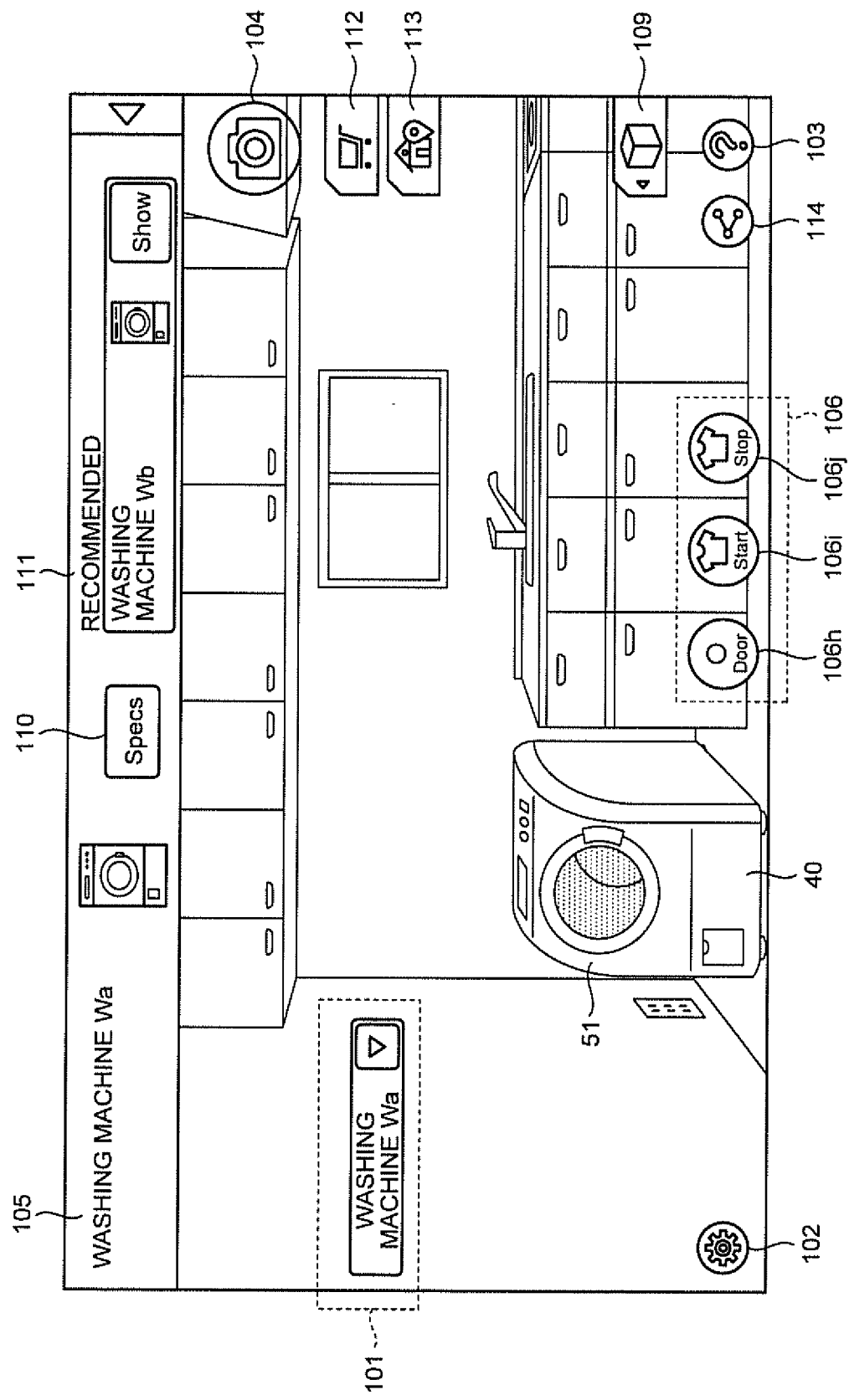
FIG. 34 is a diagram illustrating an example of a model display screen (for a washing machine Wa) according to the third embodiment.

FIG. 33 is a diagram illustrating an example of the model selection screen (when the list is displayed) according to the third embodiment. The example in FIG. 33 illustrates a case where the washing machine Wa, a washing machine Wb, and a washing machine We are displayed as the list by the model selection button 101 being pressed down. When the operation receiving unit 15 receives an operation of selecting a model name from the list, the generating unit 16 generates a composite image including an image depicting the virtual object 40 associated with the model name, with the image depicting the virtual object 40 being combined at the position of the AR marker 30 on the captured image. The display control unit 13 then displays a screen on which the later described UI parts (various buttons and the like, as seen in FIG. 34) have been added to the composite image, on the display unit 14. For example, if the washing machine Wa is selected, the virtual object 40 represented by "mainbodyimageWa" of the initially displayed image information (see FIG. 29) included in the display setting information is displayed at the position of the AR marker 30.

FIG. 34 is a diagram illustrating an example of a model display screen (for the washing machine Wa), according to the third embodiment. The model display screen according to the third embodiment has the model selection button 101, the setting button 102, the help button 103, the camera button 104, the model name display section 105, the operation button 106, the placement restriction region specification button 109, the product specification display button 110, the recommended product display button 111, the product purchase button 112, the map display button 113, and the share button 114.

Since description of the model selection button 101, the setting button 102, the help button 103, and the camera button 104 is the same as the description of FIG. 13, the description will be omitted.

The model name display section 105 displays therein a model name selected by the model selection button 101. In the example of FIG. 34, the washing machine Wa is displayed therein.

The operation button 106 includes a door operation button 106h, a washing operation start button 106i, and a washing operation stop button 106j.

The door operation button 106h is a button for operating opening and closing of a door 51. The door operation button 106h causes opening and closing operations to be displayed, the opening and closing operations represented by image files specified by the movable portion image information (for the door) in FIG. 30 included in the display setting information.

When the door operation button 106h is pressed down, an image (animation) depicting an operation of opening the door 51 is displayed. Specifically, if the virtual object 40 is the washing machine Wa, the image (amination) depicting the operation of opening the door 51 is displayed by use of "door_openimageWa" of the movable portion image information (see FIG. 30) included in the display setting information. When the door operation button 106h is pressed down again, an image (animation) depicting an operation of closing the door 51 is displayed. Specifically, if the virtual object 40 is the washing machine Wa, the image (amination) depicting the operation of closing the door 51 is displayed by use of "door_closeimageWa" of the movable portion image information (see FIG. 30) included in the display setting information.

The washing operation start button 106i is a button for starting washing operation. The washing operation start button 106i causes the washing operation to be displayed, the washing operation represented by an image file specified by the specification information in FIG. 31 included in the display setting information. Specifically, if the virtual object 40 is the washing machine Wa, sound corresponding to the operation sound (30 dB) based on the specification information is output and the image (amination) depicting the washing operation is displayed, by use of "washingimageWa" of the specification information (see FIG. 31) included in the display setting information.

The washing operation stop button 106j is a button for stopping the washing operation. The washing operation stop button 106j causes the display of the washing operation to be stopped, the washing operation represented by the image file specified by the specification information in FIG. 31 included in the display setting information. Specifically, if the virtual object 40 is the washing machine Wa, the output of the sound corresponding to the operation sound (30 dB) based on the specification information and the display of the image (amination) depicting the washing operation, by use of "washingimageWa" of the specification information (see FIG. 31) included in the display setting information, are stopped.

The placement restriction region specification button 109 is a button for displaying a placement restriction region specification screen. The placement restriction region specification screen is a screen for specifying a placement restriction region indicating restriction on a region, in which an object corresponding to the virtual object 40 is to be placed. The placement restriction region specification screen according to the second embodiment is similar to the placement restriction region specification screen (see FIG. 19) according to the first embodiment, and thus, description thereof will be omitted.

The product specification display button 110 is a button for displaying a product specification screen displaying detailed specification information specified by the model name being displayed in the model name display section 105. The product specification screen according to the third embodiment is similar to the product specification screen (see FIG. 20) according to the first embodiment, and thus, description thereof will be omitted.

The recommended product display button 111 is a button for displaying a model display screen for a model to be recommended to a user. The model to be recommended to the user is, for example, a model having product specifications similar to the model being displayed in the model name display section 105. When the operation receiving unit 15 receives an operation indicating that the recommended product display button 111 has been pressed down, the generating unit 16 generates a composite image including a main body image of initially displayed image information included in display setting information of the model to be recommended to the user, with the main body image being combined at the position of the AR marker 30 on the captured image. The display control unit 13 then displays a model display screen corresponding to the composite image, on the display unit 14.

The product purchase button 112 is a button for displaying a Web site, from which the model being displayed in the model name display section 105 is able to be purchased. When the operation receiving unit 15 receives an operation indicating that the product purchase button 112 has been pressed down, the communication unit 17 obtains an address of the Web site from which the model being displayed in the model name display section 105 is able to be purchased, from the storage unit 11. The display control unit 13 then displays the Web site which has been obtained by the communication unit 17 accessing the address, on the display unit 14.

The map display button 113 is for displaying a map display screen indicating a position of a store, from which the model being displayed in the model name display section 105 is able to be purchased. The map display screen according to the third embodiment is similar to the map display screen (see FIG. 21) according to the first embodiment, and thus, description thereof will be omitted.

The share button 114 is for pop-up displaying a list of sharing application, such as Facebook (registered trademark) and Twitter (registered trademark). When the operation receiving unit 15 receives an operation indicating that a sharing application has been selected, information or the like displayed on the display unit 14 is able to be shared with another user by use of the sharing application.

An information processing method according to the third embodiment is similar to the information processing method according to the first embodiment (see FIG. 22), and thus, description thereof will be omitted. Further, a hardware configuration of the information processing device 10 according to the third embodiment is similar to the hardware configuration of the information processing device 10 according to the first embodiment (see FIG. 23), and thus, description thereof will be omitted.

As described above, in the information processing device 10 according to the third embodiment, the generating unit 16 generates a composite image including the virtual object 40 representing a washing machine, with the virtual object 40 being combined at a position identified by the AR marker 30 included in the captured image. Further, the operation receiving unit 15 receives an operation causing the virtual object 40 to operate, the virtual object 40 included in the composite image displayed on the display unit 14. When the operation causing the virtual object 40 to operate is received by the operation receiving unit 15, the display control unit 13 controls, based on the display setting information including the specification information defining the specifications of the washing machine, display depicting the operation of the virtual object 40. Thereby, a user is able to more clearly get a grasp of an image of a case where the washing machine is operated.

In describing the third embodiment, although the case, where the sound information is included in the specification information when the target to be placed is a washing machine, has been described as an example, the sound information indicating the sound when the function that the target to be placed has is operated; the target to be placed is not limited to the washing machine, and may be an arbitrary apparatus.

According to an embodiment, an effect that it is possible to enable a user to more clearly get a grasp of an image of a case where a target to be placed is operated is achieved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device comprising:
    circuitry configured to:
        obtain a captured image including position identification information identifying a position at which a virtual object representing a target to be placed is to be displayed;
        generate a composite image in which the virtual object is combined at a position on the captured image, the position identified by the position identification information;
        receive an operation causing the virtual object included in the composite image, to operate; and
        control display depicting operation of the virtual object based on display setting information including specification information defining specifications of the target to be placed, in response to the circuitry receiving the operation causing the virtual object to operate, wherein
        the specification information includes speed information indicating an operation speed of a function that the target to be placed has,
        the target to be placed is a printing apparatus,
        the speed information is pages per minute (ppm), and
        the circuitry is configured to display a moving image of the virtual object, the moving image depicting how printouts are output from the printing apparatus if printing is performed, according to the ppm indicated by the specification information of the printing apparatus.

2. The information processing device according to claim 1, wherein the circuitry is further configured to:
    receive the display setting information; and
    store the display setting information.

3. The information processing device according to claim 1, wherein the circuitry is:
    further configured to receive an operation selecting a piece of identification information of the virtual object from a plurality of pieces of identification information of a plurality of virtual objects, and
    configured to generate the composite image including the virtual object identified by the selected piece of identification information, the virtual object combined at the position identified by the position identification information included in the captured image.

4. The information processing device according to claim 1, wherein the circuitry is further configured to:
    perform at least one of enlargement, reduction, movement, and rotation of the virtual object according to change of at least one of a position and a shape of the position identification information on the captured image, to generate a composite image in which how the virtual object is displayed is changed, and
    display the composite image in which how the virtual object is displayed is changed.

5. An information processing method performed by the circuitry of the information processing device according to claim 1, said method comprising:
    obtaining, by the circuitry, a captured image including position identification information identifying a position at which a virtual object representing a target to be placed is to be displayed;
    generating, by the circuitry, a composite image in which the virtual object is combined at a position on the captured image, the position identified by the position identification information;
    receiving, by the circuitry, an operation causing the virtual object included in the composite image, to operate; and
    controlling, by the circuitry, display depicting operation of the virtual object based on display setting information including specification information defining specifications of the target to be placed, in response to receiving the operation causing the virtual object to operate, at the receiving.

6. A computer program product comprising a non-transitory computer-readable medium containing an information processing program, the program causing a computer including the circuitry of the information processing device according to claim 1 to perform:
    obtaining a captured image including position identification information identifying a position at which a virtual object representing a target to be placed is to be displayed;

generating a composite image in which the virtual object is combined at a position on the captured image, the position identified by the position identification information;

receiving an operation causing the virtual object included in the composite image, to operate; and controlling display depicting operation of the virtual object based on display setting information including specification information defining specifications of the target to be placed, in response to receiving the operation causing the virtual object to operate, at the receiving.

7. An information processing device comprising:
circuitry configured to:
 obtain a captured image including position identification information identifying a position at which a virtual object representing a target to be placed is to be displayed;
 generate a composite image in which the virtual object is combined at a position on the captured image, the position identified by the position identification information;
 receive an operation causing the virtual object included in the composite image, to operate; and
 control display depicting operation of the virtual object based on display setting information including specification information defining specifications of the target to be placed, in response to the circuitry receiving the operation causing the virtual object to operate,
wherein the specification information includes brightness information indicating a brightness of a function that the target to be placed has, the target to be placed is a projection apparatus, and the circuitry is configured to display a moving image of the virtual object, the moving image depicting how an image is output from the projection apparatus if projection is performed, according to the brightness indicated by the specification information of the projection apparatus.

8. An information processing device comprising:
circuitry configured to:
 obtain a captured image including position identification information identifying a position at which a virtual object representing a target to be placed is to be displayed;
 generate a composite image in which the virtual object is combined at a position on the captured image, the position identified by the position identification information;
 receive an operation causing the virtual object included in the composite image, to operate; and
 control display depicting operation of the virtual object based on display setting information including specification information defining specifications of the target to be placed, in response to the circuitry receiving the operation causing the virtual object to operate,
wherein the specification information includes sound information indicating sound generated if a function that the target to be placed has is operated, the circuitry is further configured to output sound according to the sound information, and
wherein the target to be placed is an apparatus that generates sound if the apparatus operates, and
the circuity is configured to:
 display a moving image of the virtual object, the moving image depicting how the apparatus that generates sound operates, and
 output the sound according to the sound information indicated by the specification information of the apparatus that generates sound.

* * * * *